United States Patent
Adachi et al.

(10) Patent No.: US 7,912,489 B2
(45) Date of Patent: Mar. 22, 2011

(54) WIRELESS BASE STATION AND WIRELESS TERMINAL

(75) Inventors: Tomoko Adachi, Chiba (JP); Toshihisa Nabetani, Kanagawa (JP); Tomoya Tandai, Tokyo (JP); Katsuya Nonin, Kanagawa (JP); Satoshi Kaburaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 829 days.

(21) Appl. No.: 11/417,134

(22) Filed: May 4, 2006

(65) Prior Publication Data

US 2006/0268816 A1  Nov. 30, 2006

(30) Foreign Application Priority Data

May 27, 2005 (JP) ................. 2005-156458

(51) Int. Cl.
*H04H 20/71* (2008.01)
*H04H 60/78* (2008.01)
*H04H 60/56* (2008.01)
*H04H 60/61* (2008.01)

(52) U.S. Cl. ...................... 455/519; 455/518
(58) Field of Classification Search ................. None
See application file for complete search history.

(56) References Cited

U.S. PATENT DOCUMENTS

| | | | | |
|---|---|---|---|---|
| 5,379,047 A | * | 1/1995 | Yokev et al. | 342/457 |
| 5,666,661 A | * | 9/1997 | Grube et al. | 455/509 |
| 5,903,618 A | * | 5/1999 | Miyake et al. | 375/356 |
| 5,966,670 A | * | 10/1999 | Keskitalo et al. | 455/562.1 |
| 6,275,500 B1 | * | 8/2001 | Callaway et al. | 370/449 |
| 6,574,266 B1 | * | 6/2003 | Haartsen | 375/133 |
| 6,580,704 B1 | * | 6/2003 | Wellig et al. | 370/338 |
| 2004/0248556 A1 | * | 12/2004 | Rickhoff et al. | 455/411 |
| 2005/0170843 A1 | * | 8/2005 | Billhartz et al. | 455/456.1 |
| 2005/0232429 A1 | * | 10/2005 | Chowdhury et al. | 380/277 |
| 2005/0266798 A1 | * | 12/2005 | Moloney et al. | 455/41.2 |
| 2006/0094450 A1 | * | 5/2006 | Park et al. | 455/458 |
| 2006/0148502 A1 | * | 7/2006 | Korneluk et al. | 455/518 |

FOREIGN PATENT DOCUMENTS

| | | |
|---|---|---|
| JP | 9-107583 | 4/1997 |
| JP | 2001-218246 | 8/2001 |
| JP | 2001-230723 | 8/2001 |
| JP | 2005-33536 | 2/2005 |
| JP | 2005-64546 | 3/2005 |
| WO | WO 2004/032536 A2 | 4/2004 |

OTHER PUBLICATIONS

"DLS Operation", Medium Access Control (MAC) Quality of Service Enhancements, Section 11.7, Jan. 2005, pp. 148-152.

\* cited by examiner

*Primary Examiner* — Nick Corsaro
*Assistant Examiner* — Frank Donado
(74) *Attorney, Agent, or Firm* — Oblon, Spivak, McClelland, Maier & Neustadt, L.L.P.

(57) ABSTRACT

A wireless communication system including at least one wireless base station and two or more wireless terminals, and each of the wireless terminals can communicate with the wireless base station or directly communicate with another wireless terminal. The wireless base station observes reception frames from the wireless terminals, and transmits to one of the wireless terminals a start frame for starting direct communication of the wireless terminal concerned with another wireless terminal on the basis of the reception information of the reception frames.

8 Claims, 19 Drawing Sheets

- FRAME CONTROL FIELD
- DURATION/ID FIELD
- ADDRESS FIELD
- SEQUENCE CONTROL FIELD

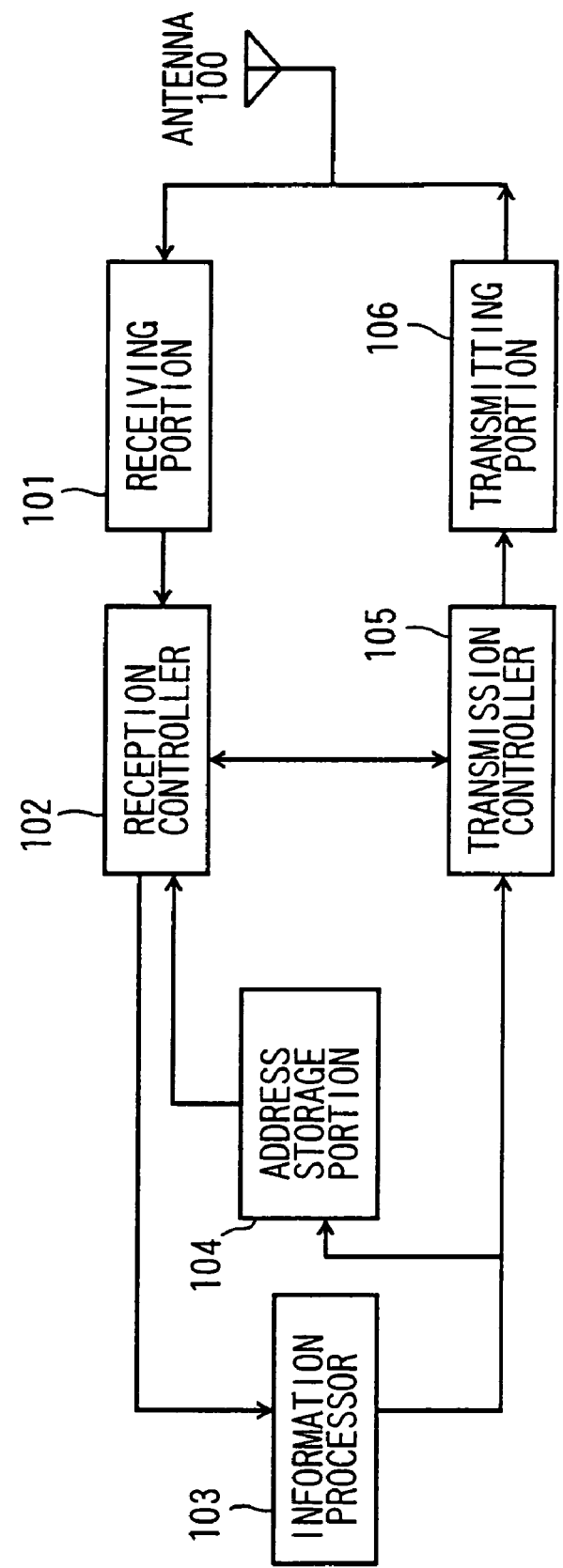
F I G . 1 4

- FRAME CONTROL FIELD
- DURATION/ID FIELD
- ADDRESS FIELD
- SEQUENCE CONTROL FIELD

WIRELESS BASE STATION AND WIRELESS TERMINAL

CROSS-REFERENCE TO RELATED APPLICATIONS

This application is based upon and claims the benefit of priority from the prior Japanese Patent Application No. 2005-156458, filed on May 27, 2005; the entire contents of which are incorporated herein by reference.

TECHNICAL FIELD

The present invention relates to a wireless communication system in which a wireless terminal communicates with a wireless base station or directly communicates with another wireless terminal.

BACKGROUND OF THE INVENTION

There exist various procedures of making direct communications between terminals under a wireless base station or directly starting or stopping the communications between the terminals.

For example, a wireless LAN system based on IEEE 802.11 (ISO/IEC 8802-02-11:1999 (E) ANSI/IEEE Std 802.11, 1999 edition) is known as a wireless LAN. A group executing additive corrections associated with QoS (Quality of Service) has considered a wireless LAN system for making direct communications between terminals under a wireless base station and the procedure of setting up (starting) or tearing down (stopping) the direct communications between the terminals in the system concerned.

Furthermore, in the case of Japanese digital codeless telephones (Personal Handyphone System:PHS), the direct communication mode between terminals can be used in addition to the communication mode via wireless base station between terminals.

The wireless communication system in which a wireless terminal communicates with a wireless base station or directly communicates with another wireless terminal does not have any method of actually estimating and judging whether the wireless terminal is under such a communication condition that direct communication can be performed between terminals under the initiative of the wireless base station or the communication condition is better than that of the communication via the wireless base station.

Accordingly, there actually frequently occurs such a situation that even when direct communication is started between wireless terminals under the initiative of the wireless base station, the direct communication is actually improper, and the efficiency is low.

Furthermore, the wireless base station does not have any method of judging whether the communication condition falls into an improper condition to the direct communication between wireless terminals after the direct communication is held, and there is only a method of tearing down the direct communication on the basis of the judgment at the wireless terminal side.

In order to detect a partner wireless terminal with which the wireless terminal concerned makes direct communication under the initiative of the wireless terminal or a partner wireless terminal with which it is better for the wireless terminal concerned to directly communicate than the communication via the wireless base station or make a judgment as to whether the direct communication is ceased and the communication is switched to the communication via the wireless base station, the processing load at the wireless terminal side should increase, and the power consumption and construction scale of the wireless terminal should increase.

Furthermore, in the procedure of starting the direct communication, when the direct communication is started under the initiative of the wireless terminal and through the wireless base station, the frame exchange amount required for the starting procedure is larger than the communication under the initiative of the wireless base station by the amount corresponding to the start request frame from the wireless terminal. Likewise, in the procedure of stopping the direct communication, when the direct communication is stopped under the initiative of the wireless terminal and through the wireless base station, the frame exchange amount required for the stopping procedure is larger than the communication under the initiative of the wireless base station by the amount corresponding to the stop request frame from the wireless terminal.

In addition, no consideration has been made concerning the judgment as to the setup or teardown of the direct communication on the basis of information on the direction of a directional beam under the initiative of the wireless base station in the use style that the wireless base station uses directional beams for communications between wireless terminals.

Furthermore, when the direct communication is started through the intervention of the wireless base station, no consideration has been made in the case where the directional beam directed to the wireless terminal is used, and the information concerning the direction of the directional beam has not been used. Furthermore, there has not been any method of specifically using the information of the reception frame from the wireless terminal when the wireless base station intervenes.

Therefore, the present invention has an object to provide a judgment of starting the direct communication between wireless terminals at a wireless base station and also a judgment of starting the direct communications between wireless terminals at a wireless terminal when the above situations exist.

BRIEF SUMMARY OF THE INVENTION

According to embodiments of the present invention, in a wireless communication system comprising at least one wireless base station and plural (two or more) wireless terminals, each wireless terminal being able to communicate with the wireless base station or directly communicate with another wireless terminal, the wireless base station observes reception frames from a first wireless terminal corresponding to one of the plural wireless terminals and a second wireless terminal different from the first wireless terminal, and transmits to the first wireless terminal a start frame for starting the direct communication between the first and second wireless terminals on the basis of the reception information of the reception frames.

According to embodiments of the present invention, in a wireless communication system comprising at least one wireless base station and plural (two or more) wireless terminals, each wireless terminal being able to communicate with the wireless base station or directly communicate with another wireless terminal, the wireless base station observes reception frames from a first wireless terminal corresponding to one of the plural wireless terminals and a second wireless terminal different from the first wireless terminal, and transmits to the first wireless terminal a stop frame for stopping the direct communication between the first and second wireless terminals on the basis of the reception information of the reception frames.

According to embodiments of the present invention, in a wireless communication system comprising at least one wireless base station and plural (two or more) wireless terminals, each wireless terminal being able to communicate with the wireless base station or directly communicate with another wireless terminal, the wireless base station directs beams having directivity to a first wireless terminal corresponding to one of the plural wireless terminals and a second wireless terminal different from the first wireless terminal to make communications, and transmits to the first wireless terminal a start frame for starting the direct communication between the first and second wireless terminals on the basis of the direction of the directional beam to the first wireless terminal and the direction of the directional beam to the second wireless terminal.

According to embodiments of the present invention, in a wireless communication system comprising at least one wireless base station and plural (two or more) wireless terminals, each wireless terminal being able to communicate with the wireless base station or directly communicate with another wireless terminal, on the basis of estimation of the angle of arrival based on reception frames from a first wireless terminal corresponding to one of the plural wireless terminals and a second wireless terminal different from the first wireless terminal, the wireless base station transmits to the first wireless terminal a start frame for starting the direct communication between the first and second wireless terminals.

According to embodiments of the present invention, in a wireless communication system comprising at least one wireless base station and plural (two or more) wireless terminals, each wireless terminal being able to communicate with the wireless base station or directly communicate with another wireless terminal, the wireless base station directs beams having directivity to a first wireless terminal corresponding to one of the plural wireless terminals and a second wireless terminal different from the first wireless terminal to make communications, and transmits to the first wireless terminal a stop frame for stopping the direct communication between the first and second wireless terminals on the basis of the direction of the directional beam to the first wireless terminal and the direction of the directional beam to the second wireless terminal.

According to embodiments of the present invention, in a wireless communication system comprising at least one wireless base station and plural (two or more) wireless terminals, each wireless terminal being able to communicate with the wireless base station or directly communicate with another wireless terminal, on the basis of estimation of the angle of arrival based on reception frames from a first wireless terminal corresponding to one of the plural wireless terminals and a second wireless terminal different from the first wireless terminal, the wireless base station transmits to the first wireless terminal a stop frame for stopping the direct communication between the first and second wireless terminals.

According to embodiments of the present invention, the received electric field intensities from two wireless terminals are high at the wireless base station, and thus the wireless base station can estimate that the two wireless terminals exist in the neighborhood of the wireless base station and the wireless communication link state is also good between the two wireless terminals. Accordingly, the actual connectable probability and the communication quality at the connection time can be enhanced, and also the start of the direct communication between the two wireless terminals can be indicated.

BRIEF DESCRIPTION OF THE DRAWINGS

FIG. 14 is a diagram showing the construction of the transmitting and receiving portion of the wireless terminal according to the first embodiment;

DETAILED DESCRIPTION OF THE INVENTION

Figure 1:
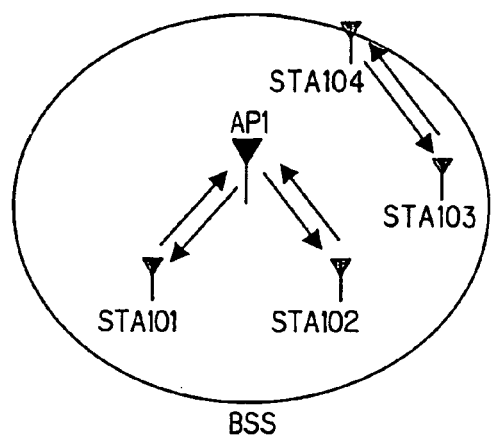
FIG. 1 is a diagram showing the construction of BSS comprising one wireless base station and plural wires terminals according to a first embodiment in a first wireless communication system of the present invention.

Embodiments according to the present invention will be described with reference to the accompanying drawings.

In the following description, the basic system construction will be described on the basis of an IEEE 802.11 wireless LAN system.

The IEEE 802.11 standard is the standard relating to the physical (PHY) layer and the medium access control (MAC) layer. The following processing will be described by mainly noting the processing in the MAC layer.

The IEEE 802.11 standard contains standards positioned as amendment, recommended practice, etc. of the base IEEE 802.11 standard such as IEEE 802.11a, IEEE 802.11b, IEEE 802.11d, etc.

Encircled numbers used in the drawings are substituted by numbers in parentheses like (1), (2), . . . , because it is impossible to express the encircled numbers in the specification.

Embodiments of a First Wireless Communication System

First, a first wireless communication system constructed by a wireless base station 1 and plural wireless terminals (STA9 will be described by using first to twenty fifth embodiments with reference to the drawings.

First Embodiment

FIG. 1 shows a communication style in which plural wireless terminals (STAs) 101 to 104 are wirelessly connected to one wireless base station (AP) 1 in the wireless LAN system of IEEE 802.11 according to the first embodiment. The constituent unit comprising the wireless base station and the plural wireless terminals in IEEE 802.11 as described above is called as "BSS (Basic Service Set)".

When a wireless terminal communicates with another wireless terminal in the same BSS, the wireless terminal concerned carries out any one of the communication via the wireless base station and the direct communication with the other wireless terminal. In this case, the selection criterion for the method of communicating with the other wireless terminal is based on the instruction from the wireless base station.

Figure 2:
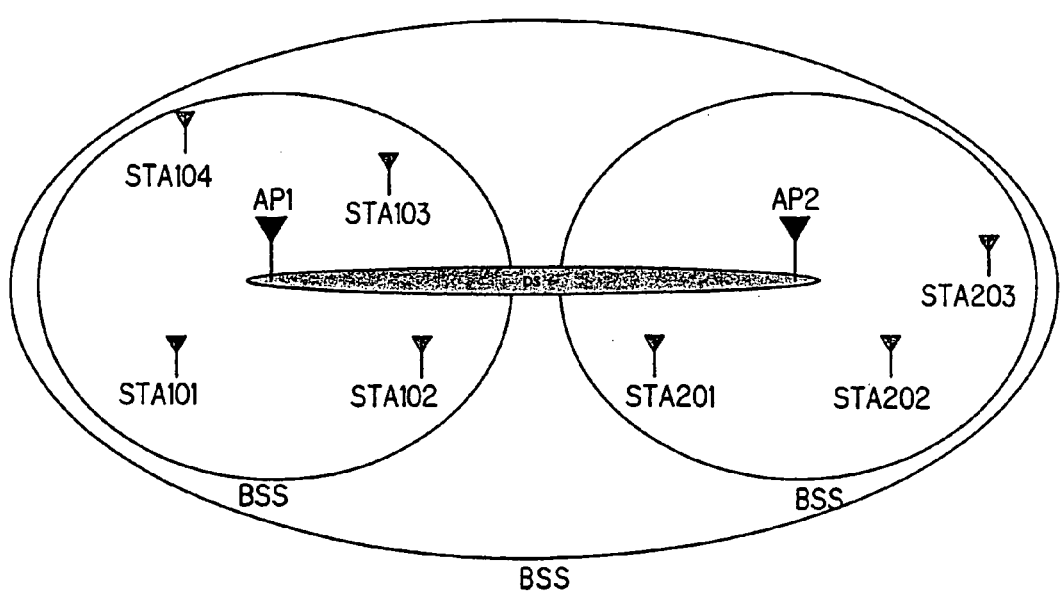
FIG. 2 is a diagram showing a construction of another wireless LAN system according to the first embodiment.

In FIG. 1, the wireless communication system is constructed by only one BSS. However, it may be constructed by plural BSSs as shown in FIG. 2. The constituent unit of the wireless communication system as described above is called as "ESS (Extended Service Set)" in IEEE 802.11. The relationship between wireless base stations is called as DS (Distributed System), and they may be connected to one another through a wired or wireless infrastructure. One or a limited number of BSSs may be designed to support the direct communication between the terminals.

(1) Processing of Wireless LAN System

The processing of the wireless LAN system will be described with reference to FIG. 1.

When the wireless base station 1 wirelessly communicates with each of the wireless terminal 101 and the wireless terminal 102, the wireless base station 1 holds reception frame information of reception frames from the wireless terminal 101 and the wireless terminal 102 and judges on the reception frame information whether the direct communication can be performed between the wireless terminal 101 and the wireless terminal 102.

Figure 3:
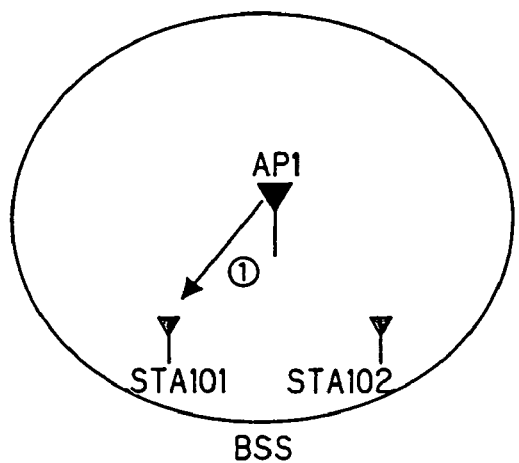
FIG. 3 is a diagram showing when the wireless base station of the first embodiment transmits a frame for indicating the start of a direct communication to a wireless terminal.

When it is judged that the direct communication can be performed, the wireless base station 1 transmits a frame (1) for instructing the start of a direct communication to any wireless terminal, for example, the wireless terminal 101 as shown in FIG. 3.

For example, in IEEE 802.11, MAC frame transmitted/received by the wireless base station or the wireless terminal is roughly classified into three types of frames: a data frame, a management frame and a control frame. All these frames may be held in the wireless base station 1 as reception frame information.

The frame (1) for instructing the start of the direct communication from the wireless base station 1 may be one kind of management frame in the MAC frame of IEEE 802.11, or a frame which is generated in a higher-level layer than the MAC layer, for example, the TCP/IP layer and also handled as a data frame in MAC. The following description will be made on the basis of the processing in MAC of IEEE 802.11. Accordingly, in this case, the frame (1) for instructing the start of the direct communication is handled as a management frame in MAC.

(2) Construction of MAC Frame

Figure 4:
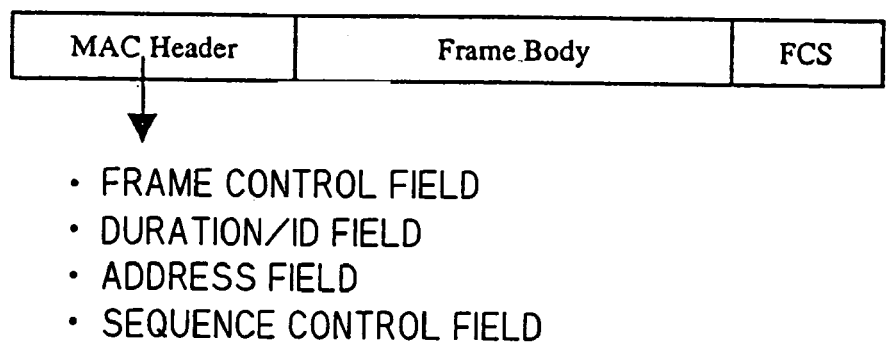
FIG. 4 is a diagram showing a representative MAC frame format of IEEE 802.11.

FIG. 4 shows the MAC frame format in the IEEE 802.11 wireless LAN system.

The MAC frame comprises an MAC Header portion in which information required for the frame reception processing is set, an Frame body portion in which information corresponding to the type of a frame, for example, data delivered from a higher-level LLC (Logic Link Control) layer or the like is inserted, and an FCS (Frame Check Sequence) portion constructed by 32-bit CRC (Cyclic Redundancy Code) used to judge whether the MAC Header portion and the Frame Body portion is correctly received. In the MAC header portion are put, in accordance with the frame type, an Frame Control field, a Duration/ID field which indicates a period (NAV: Network Allocation Vector) for suppressing transmission when virtual carrier sense is executed or indicates ID (AID: Association Identifier) of the wireless terminal allocated by the wireless base station, an MAC address field (plural MAC address fields exist) to indicate such as the MAC address of a direct transmission destination, a final destination and the transmission source, a Sequence Control field in which the Sequence number of data to be transmitted and a Fragment number when fragmented, etc. In the Frame Control field are put a Type field indicating the frame type, a Subtype field indicating the frame subtype, a ToDS bit indicating addressing or non-addressing to DS (that is, to the wireless base station), a FromDS bit indicating transmission fromDS (that is, from the wireless base station) or not.

(3) Reception Frame Information

In this embodiment, the electrical field intensity of the reception frame is used as the reception frame information. The wireless base station 1 sets a threshold value for the reception electric field intensity so as to start the processing of outputting an instruction for starting a direct communication when both the reception electric field intensities of reception frames from the wireless terminals 101 and 102 are equal to a predetermined value or more. When each of the reception frames from the wireless terminals 101 and 102 is observed, the reception electric field intensity of each reception frame is compared with the threshold value concerned, and if the reception electric field intensity is equal to or larger than the threshold value, the wireless terminal having the reception electric field intensity concerned is set as one candidate wireless terminal for the direct communication. The threshold value may be the power value of the actual reception electric field intensity, or a level value settled on the basis of some rule. Furthermore, in order to calculate a statistical reception electric field intensity, the reception frame from a desired wireless terminal may be observed at plural times to calculate the average value of the reception electric field intensities of the reception frames thus observed and make the judgment on the basis of the averaged value.

When the wireless base station 1 accepts an Association request for authentication from a wireless terminal, the wireless base station 1 collects information as to whether the wireless terminal concerned can make direct communication, and keeps only the reception frame information from the wireless terminal which can make the direct communication.

(4) Transmitting and Receiving Portion in Wireless Base Station 1

Figure 5:
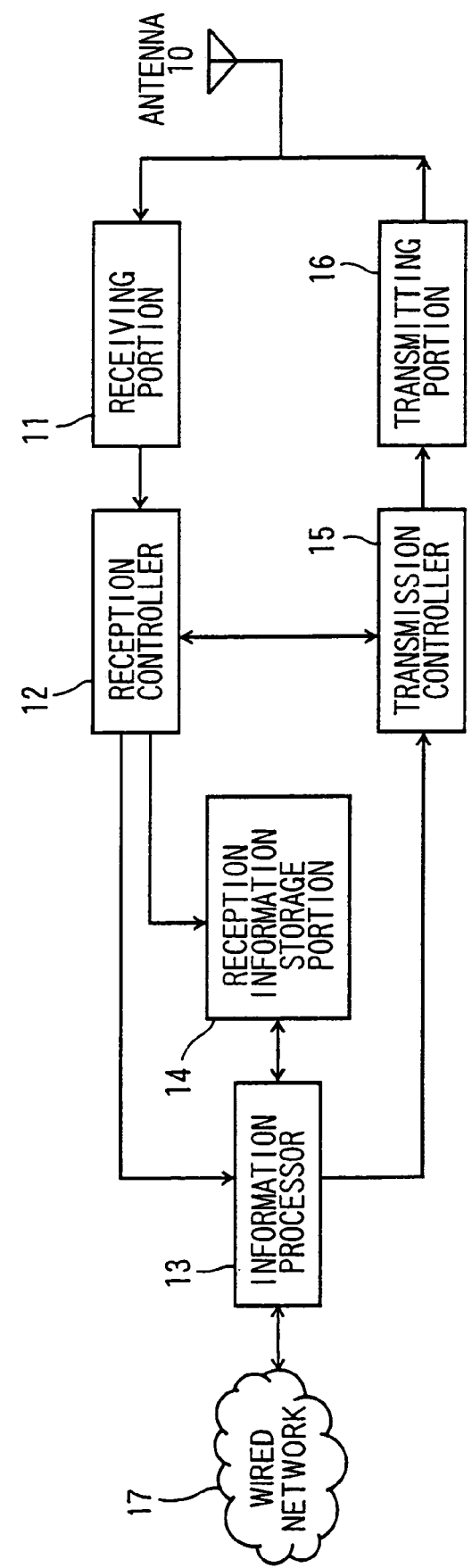
FIG. 5 is a diagram showing the construction of a transmitting and receiving portion of the wireless base station according to the first embodiment in the first wireless communication system.

FIG. 5 shows the construction of the transmitting and receiving portion in the wireless base station 1.

The wireless base station 1 comprises at least an antenna 10, a receiving portion 11, a reception controller 12, an information processor 13, a reception information storage portion 14, a transmission controller 15 and a transmitting portion 16. The reception information storage portion 14 may be provided as an external memory or installed in the reception controller 12.

For example, when transmission data are created or transmission of the transmission data is instructed (a transmission request occurs) by user's operation, the information processor 103 delivers the transmission data to the transmission controller 15 in response to this user's operation. The transmission data may be an IP packet, for example. The transmission controller 15 carries out predetermined transmission processing based on IEEE 802.11 (contains such as IEEE 802.11a and IEEE 802.11b) such as generation of frames to be transmitted to another wireless base station or wireless terminal in broadcast, multicast, unicast mode, etc. The digital data of thus-generated MAC frames which are defined in IEEE 802.11, for example, are converted to a wireless signal having a prescribed frequency through the transmitting portion 16, and then transmitted as a transmission signal from the antenna 10 to another wireless base station or wireless terminal. The information processor 103 may be connected to a wired network 17. When data are input from the wired network, if the data are addressed to another wireless base station or wireless terminal, the data are likewise processed and output as a transmission signal.

The reception data input from the antenna 10 are subjected to the processing containing demodulation and decoding in the reception portion 11 to generate a reception signal, and when the reception signal is input to the reception controller 12, the reception signal is subjected to predetermined reception processing based on IEEE 802.11 (contains such as 802.11a and 802.11b), etc. for example. In the reception controller 12, the reception signal is converted to an MAC frame as digital data, and reception data are extracted from the data field in the MAC frame and delivered to the information processor 13. In this case, the information processor 13 carries out the processing of displaying the reception data on a display, etc. The information processor 13 may carry out various kinds of information processing in addition to the above processing. Furthermore, when the information processor 13 is connected to the wired network 17 and the reception data are addressed to another wireless terminal such as another wireless base station or the like which is connected onto the wired network 17, data are output from the information processor 13 to the wired network 17.

The wireless base station 1 is further equipped with a reception information storage portion 14. When the wireless base station 1 receives a frame from a wireless terminal, the reception information of the frame from the reception controller 12 (for example, in this case, the reception information indicates whether the reception electric field of the frame concerned is equal to or larger than the threshold value or indicates only the frame whose reception electric field is equal to or larger than the threshold value) is stored together with the identifier of the wireless terminal transmitting the frame concerned, for example, the address information of the wireless terminal concerned, or the MAC address in the case of IEEE 802.11 in the reception information storage portion 14.

In the reception information storage portion 14, only the reception information relating to a limited number of wireless terminals may be collected. In this case, the reception information of wireless terminals to be collected in the reception information storage portion 14 may be indicated by the information processor 13. Alternatively, all the wireless information of the wireless terminals which are received in the reception controller 12 may be held. Here, for example, as described above, the reception information of the received frames may be filtered and collected by using the information as to whether the wireless terminal can make the direct communication or not. In this case, for example, the MAC addresses of the wireless terminals which can make the direct communication are stored in advance, and the transmission source address of the received frame is extracted from the address field and compared with the MAC addresses. If the transmission source address is coincident with any one of the MAC addresses, the reception information of the received frame is held.

When there are two transmission source wireless terminals having reception frames whose reception electric fields are equal to or larger than the threshold value, the reception information processor 14 delivers the information to the information processor 13. The information processor 13 notifies the transmission controller 15 so as to generate, for one of the wireless terminals, for example, the wireless terminal 101, a frame (1) for instructing the start of the direct communication between the wireless terminals 101 and 102. The transmission controller 15 generates the frame for instructing the start of the direct communication addressed to the wireless terminal 101. The digital data of the thus-generated frame are converted to a wireless signal through the transmitting portion 16 and then transmitted as a transmission signal from the antenna 10. When there are two or more wireless terminals satisfying the above condition, with respect to all the pairs of the wireless terminals concerned, the frame (1) for instructing the start of the direct communication may be transmitted to one wireless terminal of each of all the pairs in the information processor 13, or the transmission of the frame (1) for instructing the direct communication may be restricted in the reception information processor 14 such as the combinations (pairs) of the wireless terminals are limited on the basis of how degree the reception electric field intensity of the reception frame is larger than the threshold value and then the combinations thus limited are notified to the information processor 13.

(5) Processing at Wireless Base Station 1

Figure 6:
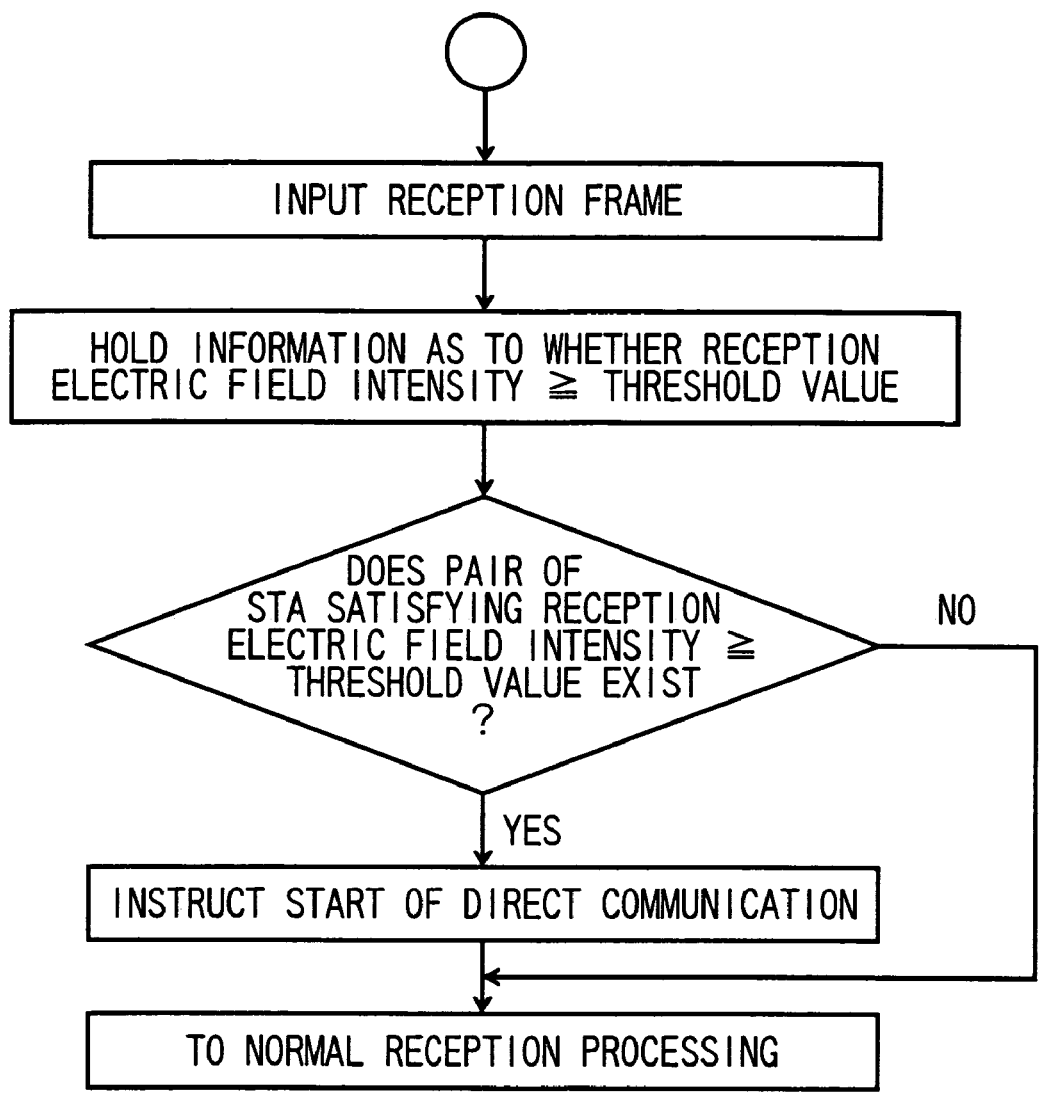
FIG. 6 is a flowchart showing the reception processing in the wireless base station according to the first embodiment.

FIG. 6 is a flowchart showing the processing of receiving a frame at the wireless base station 1 and identifying a combination (or pair) of wireless terminals that can make the direct communication.

When receiving a frame, it is judged whether the reception electric field intensity of the frame concerned is equal to or larger than the threshold value of the reception electric field allowing the direct communication, and this information is held. In this case, only the reception frame information from wireless terminals which actually make the direct communication may be collected on the basis of the information as to whether the wireless terminal has a capability of making the direct communication, for example, in such a case where an Association request is accepted or the like.

In both the cases, when a combination (pair) of wireless terminals whose reception electric field intensities is equal to or larger than the threshold value exists, the wireless base station 1 makes a notification from the information processor 13 to the transmission controller 15 so as to generate a frame for instructing the start of a direct communication which is addressed to one wireless terminal of the corresponding combination (pair), for example, the wireless terminal 101. With respect to the received frame, it is subjected to the normal reception frame processing.

(6) Effect of this Embodiment

Since the reception electric field intensities from the two wireless terminals at the wireless base station are high as described above, the wireless base station can estimates that the two wireless terminals exist in the neighborhood of the wireless base station and the state of the wireless communication link between these wireless terminals is good enough for direct communication. Therefore, the actual connectable probability and the communication quality at the connection time can be enhanced, and also the start of the direct communication between the two wireless terminals can be instructed.

Second Embodiment

The second embodiment is basically based on the first embodiment, and thus the different point of the second embodiment from the first embodiment will be mainly described hereunder.

The different point of the second embodiment from the first embodiment is as follows. The address information of the transmission source of a reception frame, in other words, the MAC address of the wireless terminal which transmitted the frame is held at the wireless base station as frame information in place of holding the judgment information as to whether the reception electric field intensity is equal to or larger than the threshold value when the frame is received from the wireless terminal.

For example, after the authentication process between the wireless terminal and the wireless base station is finished, where the authentication process includes the Association or Reassociation process in IEEE 802.11, the address information is held while only the data frame from the wireless terminal is targeted, whereby the wireless terminal which actually carries out transmission/reception (have communication activities) in BSS managed by the wireless base station can be set as a candidate which is made to make direct communication.

This embodiment will be described in detail with reference to FIG. 1 of the first embodiment.

For example, it is assumed that the wireless terminal 101 and the wireless terminal 102 carry out the Association processing with the wireless base station 1 and are connected to the wireless base station 1. When the wireless terminal 101 afterward transmits a data frame to the wireless base station 1, the MAC address of the wireless terminal 101 is held in the wireless base station 1. When the wireless terminal 102 transmits a data frame to the wireless base station 1, the MAC address of the wireless terminal 102 is also held in the wireless base station 1. As a result, the wireless base station 1 recognizes that the wireless terminals 101 and 102 exist as candidates of the pair between which the direct communication is made, and for example, transmits to the wireless terminal 101 an instruction frame for making the wireless terminal 101 start the direct communication with the wireless terminal 102.

Here, the reception frame at the wireless base station is not necessary to be a frame addressed and transmitted to the wireless base station by the wireless terminal, and it may be a frame which is physically receivable by the wireless base station. For example, it may be a frame which is transmitted from a wireless terminal to another wireless terminal, but received by the wireless base station.

Furthermore, the information held as the reception frame information may be held for only some fixed period. In the case where the address information of the reception frame is held, when the reception frame information is not renewed by a new reception frame for some fixed period, the reception frame information of the wireless terminal concerned may be cleared.

Only the data frame may be targeted, or the frame type needs not to be restricted as described above.

This will be described hereunder with reference to FIG. 1 of the first embodiment.

For example, when the wireless base station 1 receives a frame from the wireless terminal 101, it holds the MAC address of the wireless terminal 101. However, when the wireless base station 1 does not receive any frame from the wireless terminal 101 for some fixed period, it clears the thus-held MAC address of the wireless terminal 101. When the wireless base station 1 receives a frame from the wireless terminal 102 after the MAC address of the wireless terminal 101 is cleared, the MAC address of the wireless terminal 102 is held, however, the wireless base station 1 cannot make the wireless terminal 101 as a partner candidate for the direct communication with the wireless terminal 102 because the MAC address of the wireless terminal 101 is cleared.

As described above, the wireless terminals which actually carry transmission/reception (has communication activities) for the same period in the BSS managed by the wireless base station can be set as candidates between which the direct communication is made.

Furthermore, the address information held for only the fixed period and the combination information of the reception electric field intensity and the threshold value in the first embodiment may be combined.

This will be described with reference to FIG. 1 of the first embodiment. For example, when each frame is received from the wireless terminal 101 and the wireless terminal 102, the comparison with the threshold value of the reception electric field intensity is carried out as in the case of the first embodiment in each frame, and only the transmission source MAC address whose reception frame is equal to or larger than the threshold value is held. When there is a reception frame transmitted from the wireless terminal having the same MAC address within some fixed period again and the reception electric field intensity of the reception frame concerned is equal to or higher than the threshold value of the reception electric field intensity, the timer holding the information is renewed. When no frame is received from the wireless terminal having the same MAC address within some fixed period, or when a frame is received, but the reception electric field intensity of the frame is not higher than the threshold value, the held address information is cleared.

By providing the guarantee period of the reception frame is provided as described above, the reliability of the information is more enhanced, the estimation precision of the state of the wireless communication link between the two wireless terminals contributing to the direct communication can be enhanced.

The construction of the transmitting and receiving portion in the wireless base station 1 is identical to that of FIG. 5 in the first embodiment. However, the following operation is carried out in the reception information storage portion 14.

For example, in an example in which address information is held as reception information in this embodiment, the address information is simply held as reception information in the reception information storage portion 14 in place of the address information of the wireless terminal which corresponds to the information as to whether the reception electric field intensity held in the first embodiment is equal to or larger than the threshold value.

For example, in an example in which the address information is held for some fixed period in this embodiment, when address information is held as reception information in the reception information storage portion 14, and if no frame transmitted from the wireless terminal having the same MAC address is received until some fixed period elapses (the timer of holding the information expires), the address information concerned is cleared. When a frame is received, the timer of holding the information is renewed.

For example, in an example in which the address information in this embodiment is combined with the comparison with the threshold value of the reception electric field, the MAC address of the reception frame whose reception electric field intensity is equal to or larger than the threshold value is held in the reception information storage portion 14, and if the same condition is not satisfied until some fixed period elapses (the timer of holding the information expires) (no frame is received from the wireless terminal of the MAC address or the reception electric field intensity does not is not equal to or larger than the threshold value even when the frame is received), the address information is cleared. If the above condition is satisfied (i.e., a frame from the wireless terminal of the MAC address concerned is received and the reception electric field intensity of the frame concerned is larger than the threshold value), the timer of holding the information is renewed.

On the basis of the information thus held, the generation of the frame for instructing the start of the direct communication is instructed to the transmission controller 15.

The judgment processing relating to the instruction of starting the direct communication at the wireless base station 1 is basically similar to that of FIG. 6 in the first embodiment. The portion of holding the result information of the comparison between the reception electric field intensity and the threshold value reflects the operation of the reception information storage portion 14.

As described above, if the address information is held while only the data frame from the wireless terminal is targeted after the authentication process between the wireless terminal and the wireless base station (after the Association or Reassociation process between the wireless terminal and the wireless base station is finished in IEEE 802.11, where the authentication process includes the Association or Reassociation process in IEEE 802.11), the wireless terminal which actually carries out transmission/reception (has communication activities) in the BSS managed by the wireless base station can be set as a candidate for direct communication.

Furthermore, the guarantee period for the reception frame information is provided by holding the reception frame information for some fixed period, the reliability of the information is more enhanced, and the estimation precision of the state of the wireless communication link between the two wireless terminals involved in the direct communication can be enhanced.

Furthermore, the guarantee period of the reception frame information in the first embodiment is provided by providing the guarantee period to the information of the reception electric field intensity in the first embodiment, the reliability of the information is more enhanced, and the estimation precision of the state of the wireless communication link between the two wireless terminals involved in the direct communication can be enhanced.

Third Embodiment

This embodiment is basically based on the first embodiment, and the different point of the second embodiment from the first embodiment will be mainly described.

The different point of this embodiment from the first embodiment resides in that when a frame is received from a wireless terminal and held in the wireless base station, an error rate of the reception frame is particularly used.

The error rate may be a bit error rate, a packet error rate or a frame error rate in the PHY layer or a CRC error in the MAC layer may be used.

This will be described with reference to FIG. 1 of the first embodiment.

In the bit error rate, the packet error rate or the frame error rate, a reference rate for identifying a candidate for direct communication is settled, and when the error rate of the frame received from a wireless terminal, for example, the wireless terminal 101 is lower than the reference rate, the address information of the wireless terminal 101 is held. Likewise, when a frame is received from another wireless terminal, if the error rate thereof is lower than the reference rate, the address information of the transmission source wireless terminal of the frame concerned is held.

In order to determine the error rate of the frame, the reception frame from a desired wireless terminal (and the wireless base station) may be observed at plural times.

In the CRC error, if the received frame is a CRC error, the judgment as to whether the direct communication can be performed is not carried out.

The construction of the transmitting and receiving portion in the wireless base station 1 is identical to that of FIG. 5 in the first embodiment. However, in the reception information storage portion 14, the judgment using the error rate in place of the reception electric field intensity is carried out.

The judgment processing relating to the instruction of starting the direct communication at the wireless base station 1 is basically identical to that of FIG. 6 in the first embodiment. However, the result information as to whether the error rate of the reception frame is lower than the threshold value or not is held in place of holding the result information based on the comparison between the reception electric field intensity and the threshold value.

In this embodiment, the judgment of the first embodiment and the judgment relating to the error rate may be combined. Furthermore, the judgment relating to the error rate may be added to the second embodiment.

Accordingly, the state of the wireless communication link between the two wireless terminals involved in the direct communication can be estimated by using the information relating to the error rate of the reception frame, and the actual connectable probability and the communication quality at the connection time can be enhanced. In addition, the start of the direct communication between the two wireless terminals can be instructed.

By combining this embodiment with the first embodiment, the estimation precision of the wireless communication link state between the two wireless terminals involved in the direct communication can be enhanced.

Furthermore, by combining this embodiment with the second embodiment, the guarantee period of the information relating to the error rate of the reception frame can be added, and the wireless communication link state between the two wireless terminals involved in the direct communication can be estimated.

Fourth Embodiment

This embodiment is basically based on the first embodiment, and the different point of this embodiment from the first embodiment will be mainly described.

The different point of this embodiment from the first embodiment resides in that the reception electric field intensity of the reception frame is compared with the threshold value and a frame for stopping the direct communication when the reception electric field intensity is lower than the threshold value is transmitted to one of the two wireless terminals making the direct communication.

The reception frame from the wireless terminal at the wireless base station is unnecessary to be a frame addressed to the wireless base station, and for example, a frame exchanged under the direct communication between wireless terminals may be received.

Furthermore, the reception frame may be a reception frame at the wireless base station when a frame is intermittently transmitted/received between each wireless terminal and the wireless base station during the period when the direct communication has been already set up between the wireless terminals.

When the reception electric field intensity of the reception frame from one of the two wireless terminals making the direct communication with the wireless base station is lower than the threshold value, but the reception electric field intensity of the reception frame from the other wireless terminal is higher than the threshold value, a frame for stopping the direct communication is transmitted to the transmission source wireless terminal having the higher reception electric field intensity, whereby the instruction of stopping the direct communication can be surely transmitted to the wireless terminal.

The construction of the transmitting and receiving portion in the wireless base station 1 is the same as that of FIG. 5 in the first embodiment. However, in the reception information storage portion 14, the pair of the wireless terminals making the direct communication is stored, and the comparison result information between the reception electric field intensity of the reception frame and the threshold value is used to instruct to stop the direct communication in place of the instruction of starting the direct communication.

The judgment processing relating to the instruction of stopping the direct communication at the wireless base station 1 is basically identical to that of FIG. 6 in the first embodiment. However, in this processing, when the reception electric field intensity is compared with the threshold value, the result as to whether the reception electric field intensity is lower than the threshold value is held as information, and either one of the paired wireless terminals making the direct communication carries out the processing of transmitting a frame for instructing the stop of a direct communication when there exists a pair of wireless terminals satisfying the above condition (i.e., the reception electric field intensity of either one of the wireless terminals is lower than the threshold value).

Through the above operation, the wireless base station can estimate that the two wireless terminals may exist far away from the wireless base station because the reception electric field intensities from the two wireless terminal at the wireless base station are low and also the two wireless terminals may be far away from each other with a high probability, so that the wireless communication link state between the two wireless terminals is severe, the connection state of the direct communication is severe and the communication quality is low. Accordingly, the wireless base station can instruct to cease the direct communication between the two wireless terminals.

Furthermore, when the reception electric field intensity of the reception frame of one of the two wireless terminals making the direct communication at the wireless base station is lower than the threshold value of the reception electric field intensity while the reception electric field intensity of the reception frame of the other wireless terminal is higher than the threshold value, a frame for ceasing the direct communication is transmitted to the transmission source wireless terminal having the higher reception electric field intensity, whereby the instruction of ceasing the direct communication can be more surely notified to the wireless terminal.

Fifth Embodiment

This embodiment is basically based on the fourth embodiment, and the different point of this embodiment from the fourth embodiment will be mainly described hereunder.

The different point of this embodiment from the fourth embodiment is as follows. When the wireless base station receives a frame from a wireless terminal, the wireless base station holds the address information of the transmission source of a reception frame, in other words, the MAC address of the wireless terminal which transmitted the frame concerned. Here, it is assumed that the wireless base station receives a transmission frame from one of the pair of wireless terminals making the direct communication or transmission frames from both the wireless terminals of the pair (the transmission frame(s) is (are) not addressed to the wireless base station), but the wireless base station may not hold the address information of the transmission source(s) (i.e., the wireless terminal (s) transmitting the transmission frame(s)). In this case, if the wireless base station holds the address information of one or both of the wireless terminals concerned, the wireless base station carries out the processing of transmitting a frame of stopping the direct communication to the wireless terminal or both the wireless terminals concerned. On the other hand, if the wireless base station does not hold the address information of either of the wireless terminals concerned, the wireless base station carries out the processing of transmitting the frame for stopping the direct communication between the wireless terminals concerned to any one of the wireless terminals concerned (which is determined randomly or the like).

This embodiment will be described in detail with reference to FIG. 1 showing the first embodiment.

For example, the wireless base station 1 receives a frame which is directly communicated between the wireless terminal 103 and the wireless terminal 104. It is assumed that Association or Reassociation of the wireless terminal 103 has been completed in the wireless base station 1 and thus the address information of the wireless terminal 103 is held in the wireless base station 1 whereas no Association or Reassociation of the wireless terminal 104 has not yet been completed in the wireless base station 1 and thus the address information of the wireless terminal 104 is not held in the wireless base station. When the wireless base station 1 makes the above judgment, it transmits to the wireless terminal 103 an instruction frame for stopping the direct communication with the wireless terminal 104.

For example, when both the wireless base station 1 has neither the address information of the wireless terminal 103 nor the address information of the wireless terminal 104, the wireless base station 1 transmits to any one of the wireless terminals, for example, the wireless terminal 103, an instruction frame for stopping the direct communication with the wireless terminal 104.

Accordingly, the wireless base station can be equipped with a mechanism for stopping the communication between wireless terminals out of the control of the wireless base station, so that security in BSS can be secured.

Furthermore, the information held as the reception frame information may be held for some fixed period.

When the address information of the reception frame is held, the address information of the wireless terminal concerned would be cleared if the information concerned is renewed by a new reception frame within some fixed period.

In this case, in addition to the address information based on the frame when the Association, Reassociation processing with the wireless terminal is carried out, the address information of the wireless terminal is renewed by subsequent frame exchange between the wireless terminal and the wireless base station or between the wireless terminal and another wireless terminal (the Association, Reassociation processing with the wireless base station is conducted and thus the address information is held). If there is no reception frame from the wireless terminal for some fixed period, the address information of the wireless terminal is cleared.

This will be described with reference to FIG. 1 of the first embodiment. For example, it is assumed that the wireless base station 1 holds the address information of the wireless terminal 103, however, the wireless terminal 104 does not transmit/receive any information, and the address information of the wireless terminal 104 is cleared in the wireless base station 1 because it is not renewed. In this case, when the wireless terminal 103 transmits a frame of direct communication to the wireless terminal 104 and the wireless base station 1 receives the frame concerned, on the basis of the judgment that the wireless base station 1 does not hold the address information of the wireless terminal 104 to which the frame concerned is addressed, the wireless base station 1 transmits to the wireless terminal 103 an instruction frame for stopping the direct communication with the wireless terminal 104.

Through this operation, the direct communication can be limited to only the wireless terminals that carry out actual communication (have communication activities) for the same period in BSS managed by the wireless base station.

This can prevent the start of the direct communication with a wireless terminal that is under a power saving mode and thus is out of a receptable state (which may be called as a dozing wireless terminal under power save mode if it is expressed in IEEE 802.11).

Furthermore, the address information held for some fixed period and the comparison information between the reception electric field intensity and the threshold value in the fourth embodiment may be combined with each other.

This will be described with reference to FIG. 1 of the first embodiment.

For example, when the respective reception frames are received from the wireless terminal 103 and the wireless terminal 104, the reception electric field intensity is compared with the threshold hold in each frame as in the case of the first embodiment, and only the MAC address of the transmission source having the reception frame whose reception electric field intensity is equal to or larger than the threshold value is held. The timer for holding the address information (MAC address) thus held is renewed when there is a reception frame transmitted from the wireless terminal having the same MAC address within some fixed period and also the reception electric field intensity of the reception frame concerned is equal to or higher than the threshold value. If no frame is received from the wireless terminal having the same MAC address within some fixed period, or when a frame is received, however, the reception electric field intensity of the frame is lower than the threshold value, the held address information is cleared. When the frame of the direct communication addressed from the wireless terminal 103 to the wireless terminal 104 is received by the wireless base station 1 under the state that the address of the wireless terminal 103 is held in the wireless base station 1, but the address information of the wireless terminal 104 is cleared, the wireless base station 1 transmits to the wireless terminal 103 an instruction frame for stopping the direct communication with the wireless terminal 104.

Through the above operation, the guarantee period of the reception frame information can be provided to more enhance the reliability of the information, the estimation precision of the direct communication link state can be enhanced, and the wireless communication can be limited to the communication between two wireless terminals which can be estimated to establish an excellent link state.

Furthermore, by addressing and transmitting the instruction frame for stopping the direct communication to the wireless terminal whose address information is held, the instruction for stopping the direct communication can be more surely transmitted to the wireless terminal.

The construction of the transmitting and receiving portion in the wireless base station 1 is the same as that of FIG. 5 in the fourth embodiment. However, in the reception information storage portion 14, the address information of the wireless terminal is held (in some modes, it is renewed by the reception frame, or further renewed by the comparison result between the reception electric field intensity of the reception frame and the threshold value), and used for an instruction of stopping the direct communication.

The judgment processing on the direct communication stopping instruction at the wireless base station 1 is basically the same as that of FIG. 6 in the fourth embodiment. In this judgment processing, the wireless base station 1 holds the address information of the wireless terminal (in some modes, it is renewed by the reception frame, or further renewed by the comparison result between the reception electric field intensity of the reception frame and the threshold value). The wireless base station 1 receives a frame which is directly communicated between wireless terminals, and carries out the processing of transmitting a frame of instructing the stop of the direct communication when the wireless base station 1 does not hold the address (or addresses) of either one of the transmitting and receiving wireless terminals of the frame concerned.

Through the above operation, the wireless base station can be provided with a mechanism of stopping the communication of the wireless terminal out of the control thereof, and the security in the BSS can be secured.

Furthermore, the direct communication can be limited to the wireless terminals that actually communicate with each other (have communication activities) for the same period in the BSS managed by the wireless base station.

This can prevent the start of the direct communication to the wireless terminal which is in a power saving mode and thus is not under receptable state (which may be called as a dozing wireless terminal under power save mode if it is expressed in IEEE 802.11).

Furthermore, the guarantee period of the reception frame information can be provided to more enhance the reliability of the information, the estimation precision of the direct communication link state can be enhanced, and the wireless communication can be limited to the communication between two wireless terminals which can be estimated to establish an excellent link state.

Furthermore, by transmitting the instruction frame for stopping the direct communication to the wireless terminal whose address information is held, the instruction of stopping the direct communication can be more surely transmitted to the wireless terminal.

Sixth Embodiment

This embodiment is basically based on the fourth embodiment, and the different point of this embodiment from the fourth embodiment will be mainly described.

The different point of this embodiment from the fourth embodiment resides in that when a frame is received from a wireless terminal and held in the wireless base station, an error rate of the reception frame from the wireless terminal is particularly used.

The error rate may be a bit error rate, a packet error rate or a frame error rate in the PHY layer, or an CRC error in the MAC layer may be used, for example.

When a frame to be exchanged between wireless terminals making direct communication is received and the error rate thereof exceeds a reference rate, an instruction frame for stopping the direct communication is transmitted to one of two wireless terminals making the direct communication.

Furthermore, with respect to the CRC error, if the CRC error is observed at some reference frequency or more in the wireless base station when a frame exchanged between the wireless terminals making the direct communication is received, an instruction frame of stopping direct communication is transmitted to one of two wireless terminals making the direct communication.

The construction of the transmitting and receiving portion in the wireless base station 1 is identical to that of FIG. 5 in the fourth embodiment. However, in the reception information storage portion 14, in place of the comparison result between the reception electric field of the reception frame and the threshold value, the information concerning the reception frame is used to instruct the stop of the direct communication.

The judgment processing on the direct communication stopping instruction in the wireless base station 1 is basically identical to that of FIG. 6 in the fourth embodiment, and the processing of transmitting the frame for instructing the stop of the direct communication by comparing the error rate with a threshold value is carried out.

As described above, by using the information concerning the error rate of the reception frame, the wireless communication link state between the two wireless terminals involved in the direct communication is estimated, and it can be estimated whether the connection state of the direct communication is severe and whether the communication quality is low, so that the stop of the direct communication between the two wireless terminals can be instructed.

Furthermore, by combining this embodiment with the fourth embodiment, the estimation precision of the wireless communication link state between the two wireless terminals involved in the direct communication can be enhanced, and the direct communication is limited to wireless terminals between which the communication quality is good.

By combining this embodiment with the fifth embodiment, the guarantee period of the information concerning the error rate of the reception frame is added, and the wireless communication link state between the two wireless terminals involved in the direct communication can be estimated. On the basis of this knowledge, the direct communication can be limited to wireless terminals between which the communication quality is good.

Seventh Embodiment

This embodiment is basically based on the first embodiment, and the different point of this embodiment from the first embodiment will be mainly described.

The different point of this embodiment from the first embodiment resides in that the judgment as to whether the wireless base station transmits the frame of instructing the start of the direct communication to the wireless terminal is carried out not by using the information on the reception electrical field intensity of the reception frame of the wireless terminal, but by using the information of the directional beam directed to each of the two wireless terminals.

Figure 7:
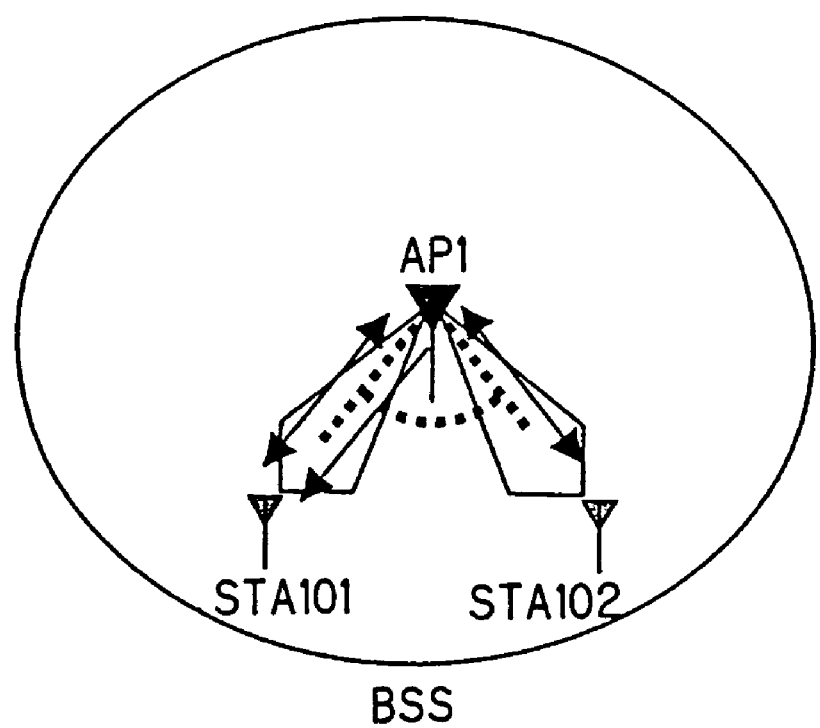
FIG. 7 is a diagram showing the construction of a wireless LAN system according to a seventh embodiment in the first wireless communication system.

In this embodiment, the construction of BSS is designed as shown in FIG. 7 in place of FIG. 1 in the first embodiment. In this mode, the wireless base station 1 communicates with each of the wireless terminals 101 and 102 by using a directional beam.

The wireless base station 1 holds the information on the direction of the directional beam directed to each of the wireless terminals 101 and 102 when carrying out the wireless communication while directing the directional beam to each of the wireless terminals 101 and 102, and judges on the basis of the information concerned whether the instruction of the direct communication between the wireless terminals is output or not. When it is judged that the instruction of the direct communication is output, the wireless base station 1 transmits the frame of instructing the start of the direct communication to any one of the wireless terminals, for example, the wireless terminal 101.

As described above, by determining the angle difference between the directional beams directed to the two wireless terminals when viewed from the wireless base station, the distance between the two wireless terminals can be approximately estimated on the basis of the information concerned and the radius of the area covered by the wireless base station, and the judgment as to whether it is possible to start the direct communication between the two wireless terminals can be carried out at the wireless base station side.

Figure 8:
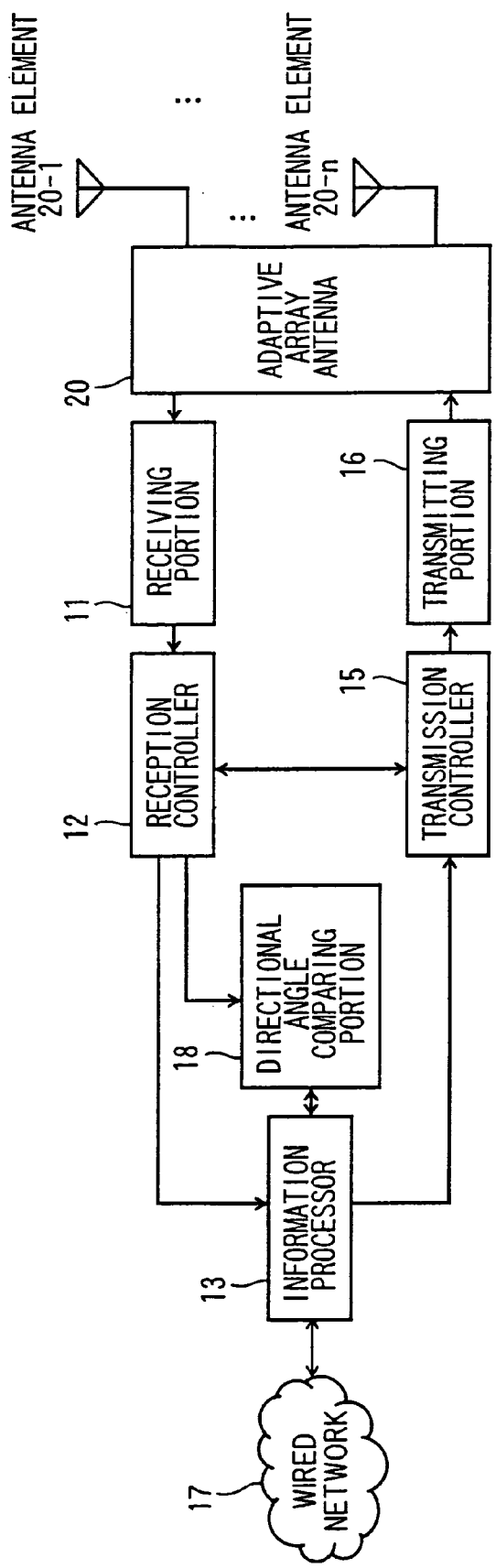
FIG. 8 is a diagram showing the construction of the transmitting and receiving portion of the wireless base station according to the first embodiment.

The construction of the transmitting and receiving portion in the wireless base station is shown in FIG. 8. The different point from the construction of FIG. 5 in the first embodiment resides in that an adaptive array antenna 20 is used in place of the antenna 10 so as to construct a directional beam, and also a directional angle comparing portion 18 for comparing the directions of the directional beams directed to the respective wireless terminals is provided in place of the reception information storage portion 14.

In the judgment processing of transmitting the frame of instructing the start of the direct communication in the wireless base station 1, the different point from that of FIG. 6 in the first embodiment resides in that the directions of the directional beams directed to both the wireless terminals as candidates for the direct communication are compared with each other in place of checking whether the reception electrical field intensities as the reception information of the pair of the wireless terminals to which the start of the direct communication is instructed are equal to or larger than the threshold value.

As described above, the wireless base station can instruct the start of the direct communication to the two wireless terminals, and also the actual connectable probability between the two wireless terminals involved in the direct communication and the communication quality at the connection time can be enhanced by using the information on the directions of the directional beams.

Eighth Embodiment

This embodiment is basically based on the seventh embodiment, and a supplementary point of this embodiment to the seventh embodiment will be mainly described hereunder.

The supplemental point of this embodiment to the seventh embodiment resides in that the angle difference between the directional beams for judging the start of the direct communication is determined and the judgment is made on the basis of the angle difference thus determined.

This will be described with reference to FIG. 7 of the seventh embodiment. The wireless base station 1 determines the angle difference between the directional beams directed to the wireless terminals 101 and 102. When the angle difference concerned is smaller than an angle difference allowing the start of the direct communication, the wireless base station 1 transmits, for example to the wireless terminal 101, a frame of instructing the start of a direct communication with the wireless terminal 102 in order to establish the direct communication between the wireless terminal 101 and the wireless terminal 102.

Through the above operation, the wireless base station can instruct the start of the direct communication to the two wireless terminals, and at the same time the actual connectable probability between the two wireless terminals involved in the direct communication and the communication quality at the connection time are enhanced, so that the judgment can be more clarified.

Ninth Embodiment

This embodiment is based on the seventh embodiment, and the different point of this embodiment from the seventh embodiment will be mainly described.

The different point of this embodiment from the seventh embodiment is as follows. That is, it is not required to the system that the wireless base station 1 communicates with the wireless terminals 101 and 102 while directing the directional beams to the wireless terminals 101 and 102. On the other hand, the wireless base station 1 estimates an arrival angle of a frame transmitted from the wireless terminal 101 when receiving the frame concerned, estimates an arrival angle of a frame transmitted from the wireless terminal 102 when receiving the frame concerned, and the judgment is carried out on the basis of direction information achieved by the estimation of the arrival angles of the frames from the wireless terminals 101 and 102.

This will be described with reference to FIG. 1 of the first embodiment.

The wireless base station 1 estimates the arrival angles of the frames transmitted from the wireless terminal 101 and 102, holds this information and judges on the information concerned whether the instruction to start the direct communication is output to the wireless terminals. Subsequently, the same operation as the seventh embodiment is carried out.

Through the above operation, the wireless base station can instruct the start of the direct communication to the two wireless terminals, and also the actual connectable probability between the two wireless terminals involved in the direct communication and the communication quality at the connection time can be enhanced by using the information based on the estimation of the arrival angles.

Tenth Embodiment

This embodiment is basically based on the ninth embodiment, and a supplementary point of this embodiment to the ninth embodiment will be mainly described.

The supplementary point of this embodiment to the ninth embodiment resides in that the difference between the directions of the estimated arrival angles of the reception frames from the wireless terminals 101 and 102 is used as arrival angle estimation information, and the angle difference for the judgment of the start of the direct communication is determined and compared with the difference in direction to carry out the judgment.

This will be described with reference to FIG. 1 of the first embodiment. The wireless base station 1 estimates the arrival angle of the frame received from each of the wireless terminal 101 and the wireless terminal 102, and when the angle difference between the directions is smaller than the angle difference for allowing the start of the direct communication, the wireless base station 1 transmits, for example to the wireless terminal 101, the instruction frame for starting the direct communication with the wireless terminal 102 in order to establish the direct communication between the wireless terminals 101 and 102.

Through the above operation, the wireless base station can instruct the two wireless terminals to start the direct communication therebetween, and also the actual connectable probability between the two wireless terminals involved in the direct communication and the communication quality at the connection time can be enhanced by using the information based on the estimation of the arrival angle, so that the judgment can be more clarified.

Eleventh Embodiment

This embodiment is basically based on the fourth embodiment, and the different point of this embodiment from the fourth embodiment will be mainly described hereunder.

The different point of this embodiment from the fourth embodiment resides in that when the wireless base station judges whether the instruction frame for stopping the direct communication between the wireless terminals is transmitted, not the information on the reception electric field intensities of the reception frames from the wireless terminals, but the information of the directions of the directional beams directed to the wireless terminals are used.

Figure 9:
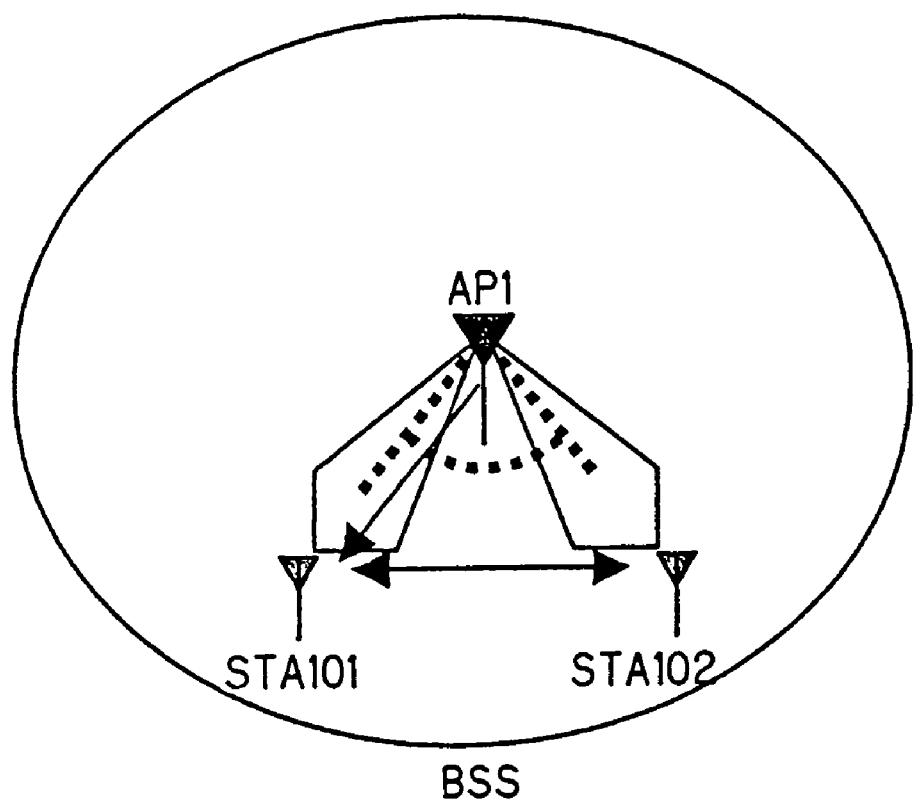
FIG. 9 is a diagram showing the construction of a wireless LAN system according to an eleventh embodiment in the first wireless communication system.

In this embodiment, the construction of BSS is designed as shown in FIG. 9 in place of that shown in FIG. 1 in the fourth embodiment. The direct communication is made between the wireless terminal 101 and the wireless terminal 102, and the wireless base station 1 directs a directional beam to each of the wireless terminals 101 and 102 and receives the frame exchange between the wireless terminals.

That is, the wireless base station 1 directs the directional beams to the respective wireless terminals 101 and 102 to receive the frame transmitted from each wireless terminal. In this case, the wireless base station 1 holds the information on the directions of the directional beams directed to the wireless terminals, and judges on the basis of this information whether an instruction for stopping the direct communication between the wireless terminals should be output or not. When it is judged that the instruction of stopping the direct communication is output, the wireless base station 1 transmits a frame of stopping a direct communication to one of the two wireless terminals, for example, to the wireless terminal 101.

By determining the angle difference between the directional beams from the two wireless terminals when viewed from the wireless base station as described above, the distance between the two wireless terminals can be approximately estimated on the basis of the above information and the radius of the area covered by the wireless base station, and the judgment as to whether it is proper or not that the direct communication between the two wireless terminals is continued can be made at the wireless base station side.

The construction of the transmitting and receiving portion in the wireless base station 1 is shown in FIG. 8 of the seventh embodiment.

In the judgment processing of transmitting the direct communication stop instructing frame in the wireless base station 1, the directions of the directional beams directed to both the wireless terminals as candidates for direct communication are compared with each other as in the case of the judgment of the seventh embodiment, however, this comparison is used to judge whether the frame of instructing the stop of the direct communication is transmitted or not.

Through the above operation, the wireless base station 1 can estimate the actual communication quality between the two wireless terminals involved in the direct communication to judge whether the direct communication should be stopped, and at the same time it can instruct to stop the direct communication between the two wireless terminals.

Twelfth Embodiment

This embodiment is basically based on the eleventh embodiment, and a supplementary point of this embodiment to the eleventh embodiment will be mainly described.

The supplementary point of this embodiment to the eleventh embodiment resides in that the angle difference between the directional beams for judging the stop of the direct communication is determined as the information on the directions of the directional beams and the judgment is carried out on the basis of the angle difference thus determined.

This will be described with reference to FIG. 9 of the eleventh embodiment. The wireless base station 1 determines the angle difference between the directional beams directed to the respective wireless terminals 101 and 102, and when the angle difference is equal to or larger than an angle difference for stopping the direct communication between the wireless terminals, the wireless base station 1 transmits, for example to the wireless terminal 101, a frame for instructing the stop of the direct communication with the wireless terminal 102.

Through the above operation, when the judgment as to the instruction of stopping the direct communication in the eleventh embodiment is carried out, the judgment based on the directions of the directional beams can be more embodied.

Thirteenth Embodiment

This embodiment is basically based on the eleventh embodiment, and the different point of this embodiment from the eleventh embodiment will be described hereunder.

The different point of this embodiment from the eleventh embodiment is as follows. That is, in this communication system, the wireless base station 1 is not required to direct the directional beams to the respective wireless terminals 101 and 102, but it is designed to estimate the arrival angle of a frame transmitted from the wireless terminal 101 when receiving the frame concerned, estimate the arrival angle of a frame transmitted from the wireless terminal 102 when receiving the frame concerned, and makes the judgment on the basis of the direction information achieved through the estimation of the arrival angles of the reception frames from the wireless terminals 101 and 102.

This will be described hereunder with reference to FIG. 1 of the first embodiment. The wireless base station 1 estimates the arrival angles of the frames received from the wireless terminals 101 and 102, holds the information concerned, and judges on the basis of the information concerned whether an instruction of stopping the direct communication between the wireless terminals 101 and 102 is output or not. The subsequent processing is the same as the eleventh embodiment.

Through the above operation, the wireless base station 1 can estimate the actual communication quality between the two wireless terminals involved in the direct communication to judge whether the direct communication should be stopped, and at the same time it can instruct to stop the direct communication between the two wireless terminals.

Fourteenth Embodiment

This embodiment is basically based on the thirteenth embodiment, and a supplementary point of this embodiment to the thirteenth embodiment will be mainly described.

The supplementary point of this embodiment to the thirteenth embodiment resides in that the difference in direction of the estimated arrival angles of the wireless terminals 101 and 102 is used as the arrival angle estimating information, and the angle difference to judge the stop of the direct communication is settled and compared with the difference in direction to perform the judgment.

This will be described with reference to FIG. 1 of the first embodiment. The wireless base station 1 estimates the arrival angle of the frame received from each of the wireless terminal 101 and the wireless terminal 102, and when the angle difference in direction is equal to or larger than the angle difference for stopping the direct communication, the wireless base station 1 transmits, for example to the wireless terminal 101, a frame for instructing the stop of the direct communication with the wireless terminal 102.

Through the above operation, when the judgment as to whether the stop of the direct communication should be instructed or not is made in the thirteenth embodiment, the judgment based on the directions of the estimated arrival angles can be more surely embodied.

Fifteenth Embodiment

This embodiment is basically based on the first and third embodiments, and an additional point of this embodiment to the first and third embodiments will be mainly described.

The additional point of this embodiment to the first and third embodiments resides in that the judgment associated with the directional beams of the seventh and eighth embodiments or the estimation of the arrival angles of the ninth and tenth embodiments is combined as a judgment.

This will be described with reference to FIG. 7 of the seventh embodiment. In the communication mode that the wireless base station communicates with the wireless terminals 101 and 102 by using the directional beam as in the case of the seventh embodiment, the reception electric fields of the past reception frames from the two wireless terminals are compared with the predetermined threshold value of the reception electric field intensity as in the case of the first embodiment, and the comparison result is held as reception frame information. When both the reception electric field intensities of the past reception frames from the two wireless terminals as candidates between which the direct communication is started are equal to or larger than the threshold value of the reception electric field intensity, the direct communication starting instruction is judged even when the angle difference of the directional beams directed to the wireless terminals 101 and 102 are equal to or larger than the threshold value of the angle difference for allowing the direct communication as in the case of the eighth embodiment which embodies the seventh embodiment. Even when both the reception electric field intensities are smaller than the threshold value of the angle difference for allowing the direct communication, the direct communication starting instruction is judged if the angle difference of the directional beams is smaller than the threshold value of the angle difference for allowing the direct communication.

In place of the reception electric field intensity of the first embodiment or in combination with it, the information on the error rate of the third embodiment may be combined with the information on the angle of the directional beam or the angle based on the arrival angle estimation.

By combining the judgment based on the reception frames with the judgment based on the information relating to the directional beams or the arrival angle estimation, the estimation precision of the wireless communication link state between the two wireless terminals involved in the direct communication can be enhanced, and the actual connectable probability and the communication quality at the connection time can be enhanced.

Sixteenth Embodiment

This embodiment is basically based on the seventh to tenth embodiments, and an additional point of this embodiment to the seventh to tenth embodiments will be mainly described.

The additional point of this embodiment to the seventh to tenth embodiments resides in that the period for holding the information of the reception frame is provided as in the case of the second embodiment.

Accordingly, the guarantee period for the reception frame information is provided in the seventh to tenth embodiments, whereby the reliability of the information can be more enhanced, and the estimation precision of the wireless communication link state between the two wireless terminals involved in the direct communication in the wireless base station can be enhanced.

Seventeenth Embodiment

This embodiment is basically based on the fourth and sixth embodiments, and an additional point of this embodiment to the fourth and sixth embodiments will be mainly described.

The additional point of this embodiment to the fourth and sixth embodiments resides in that the information relating to the directional beams of the eleventh and twelfth embodiments or the arrival angle estimation of the thirteenth and fourteenth embodiments is combined as a judgment.

This will be described with reference to FIG. 9 of the eleventh embodiment.

In the communication mode in which the wireless base station directs the directional beams to the wireless terminals 101 and 102 making the direct communication and receives the frames transmitted from the wireless terminals as in the case of the eleventh embodiment, the reception electric field intensities of the past reception frames of the two wireless terminals are compared with the threshold value of the reception electric field intensity and the comparison result is held as the reception frame information as in the case of the fourth embodiment. When both the reception electric field intensities of the past reception frames from the two wireless terminals involved in the direct communication are smaller than the threshold value of the reception electric field intensity, the judgment of stopping the direct communication is made even when the angle difference of the directional beams directed to the wireless terminals 101 and 102 is smaller than the angle difference for instructing the stop of the direct communication as in the case of the twelfth embodiment embodying the eleventh embodiment. Furthermore, even when both the reception electric intensities are equal to or larger than the threshold value of the reception electric field intensity, the judgment of stopping the direct communication is made if the angle difference of the directional beams is equal to or larger than the threshold value of the angle difference for judging the stop of the direct communication.

In place of the reception electric field intensity in the fourth embodiment or in combination with it, the information on the error rate of the sixth embodiment may be combined with the information on the angle of the directional beams or the angle based on the arrival angle estimation.

By combining the judgment based on the reception electric field intensities with the judgment based on the information on the directional beams or the arrival angle estimation, the estimation precision of the wireless communication link between the two wireless terminals involved in the direct communication and the communication quality can be enhanced, and the direct communication can be stopped.

Eighteenth Embodiment

This embodiment is basically based on the eleventh to fourteenth embodiments, and an additional point of this embodiment to the eleventh to fourteenth embodiments will be mainly described.

The additional point of this embodiment to the eleventh to fourteenth embodiments resides in that a period for holding the information on the reception frame is provided as in the case of the fifth embodiment.

Accordingly, the guarantee period for the reception frame information in the eleventh to fourteenth embodiments is provided, whereby the information liability can be more enhanced and the estimation precision of the wireless communication link state between the two wireless terminals involved in the direct communication in the wireless base station can be enhanced.

Nineteenth Embodiment

This embodiment is basically based on the first to eighteenth embodiments, and the different point of this embodiment from the first to eighteenth embodiments will be mainly described.

The different point of this embodiment from the first to eighteenth embodiments resides in that when the wireless base station transmits the instruction frame of starting or stopping direct communication to the wireless terminal, the instruction frame is addressed and transmitted to both the wireless terminals between which the direct communication is started or stopped.

For example, in such a case that both the reception electric field intensities of the reception frames from both the wireless terminals are lower than the threshold value in the fourth embodiment, by transmitting the instruction frame to both the wireless terminals, the instruction of stopping the direct communication can be surely notified.

For example, after the instruction frame is transmitted to one of the paired wireless terminals between which the direct communication is started or stopped, the same instruction frame may be transmitted to the other wireless terminal.

Furthermore, the instruction frame may be simultaneously transmitted to both the paired wireless terminals between which the direct communication is started or stopped. In IEEE 802.11, the instruction frame is transmitted while multicast addresses addressed to both the wireless terminals are written in the transmission destination address field of the frame.

By transmitting the instruction frame to both the wireless terminals involved in the direct communication, the instruction of starting or stopping the direct communication to the wireless terminals can be more surely notified.

Twentieth Embodiment

This embodiment is provided to describe the operation at the wireless terminal side which receives a frame for instructing the start of the direct communication from the wireless base station in the first to third embodiments, the seventh to tenth embodiments and the fifteenth and sixteenth embodiments.

When the wireless terminal receives the direct communication start instructing frame from the wireless base station, the wireless terminal carries out the processing of achieving the address information of the wireless terminal described in the frame of instructing the start of the direct communication, and transmitting a frame contained in transmission frames, the final destination of the frame concerned being the partner wireless terminal, to the partner wireless terminal through the direct communication.

When the partner wireless terminal with which the wireless terminal makes the direct communication is uniquely determined at the wireless terminal concerned, it is unnecessary that the address information of the partner wireless terminal is not written in the frame of instructing the start of the direct communication.

This will be described with reference to FIG. 3 of the first embodiment.

For example, the MAC address of the wireless terminal 102 is described in the frame (1) of instructing the start of the direct communication received from the wireless base station 1 so that the wireless terminal 101 make direct communication with the wireless terminal 102. When the wireless terminal 101 receives the frame (1) concerned, it extracts and achieves the MAC address of the wireless terminal 102 from the frame (1). With respect to the transmission frame whose final destination is the wireless terminal 102, the wireless terminal 101 addresses and transmits the transmission frame to the wireless terminal 102 through the direct communication without passing through the wireless base station 1.

Figure 10:
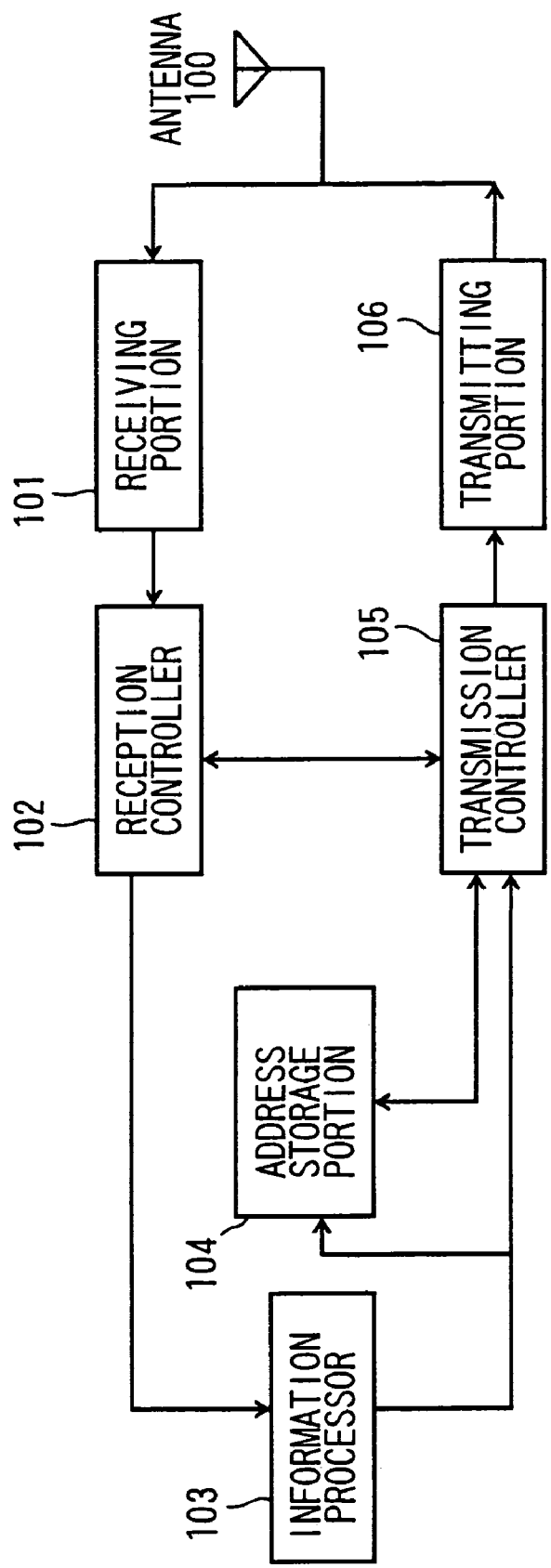
FIG. 10 is a diagram showing the construction of the transmitting and receiving portion of the wireless terminal of a twentieth embodiment in the first wireless communication system.

The construction of the transmitting and receiving portion in the wireless terminal 101 will be described with reference to FIG. 10.

The wireless terminal 101 comprises at least an antenna 100, a receiving portion 101, a reception controller 102, an information processor 103, an address storage portion 104, a transmission controller 105 and a transmitting portion 106. The address storage portion 104 may be provided as an external memory or installed in the transmission controller 105.

In the information processor 103, for example, transmission data are created by user's operation and when transmission of transmission data is instructed (a transmission request occurs), the transmission data are delivered to the transmission controller 105 in response to the transmission request. The transmission data may be an IP packet, for example. The transmission controller 105 carries out predetermined transmission processing based on IEEE 802.11 (contains standards positioned as amendment, recommended practice, etc. of IEEE 801.11 standards such as IEEE 802.11a, IEEE 802.11b, IEEE 802.11d, etc.) such as generation of frames to be transmitted to a wireless base station or another wireless terminal in broadcast, multicast, unicast mode, etc. The digital data of thus-generated MAC frames which are defined in IEEE 802.11, for example, are converted to a wireless signal having a prescribed frequency through the transmitting portion 106, and then transmitted as a transmission signal from the antenna 100 to another wireless base station or wireless terminal.

The reception data input from the antenna 100 is subjected to the processing containing demodulation and decoding to generate a reception signal in the receiving portion 101. The reception signal is then input to the reception controller 102, and subjected to predetermined reception processing based on IEEE 802.11 (containing such as 802.11a and 802.11b). In the reception controller 102, the reception signal is converted to an MAC frame as digital data, and reception data are extracted from the data field in the MAC frame and delivered to the information processor 103. In this case, the information processor 103 carries out the processing of displaying the reception data on a display, etc. The information processor 103 may be designed to carry out various kinds of information processing in addition to the above processing.

In the information processor 103, the MAC address of the partner wireless terminal of the direct communication is extracted from the frame of instructing the start of the direct communication and notified to the address storage portion 104, and the MAC address information is held in the address storage portion 104. In the address storage portion 104, MAC addresses of plural wireless terminals may be held. The MAC addresses of the partner wireless terminal as a candidate for direct communication is stored in the address storage portion 104 in advance, the MAC address of the partner wireless terminal of the direct communication extracted from the frame of instructing the start of the direct communication is compared with the MAC addresses of the partner wireless terminals as candidates for the direct communication which are held in the address storage portion 104, and when there exists the MAC address of the corresponding candidate wireless terminal, the MAC address may be used for the direct communication. Alternatively, only one of the MAC addresses of the candidate partner wireless terminals is stored in the address storage portion 104 and the MAC address may be made effective to the direct communication by receiving information indicating that the direct communication start instructing frame has been received from the information processor 103. The processing of the information extraction to be carried out in the information processor 103 may be directly carried out by the reception controller 102 and the address storage portion 104 may directly receive a notification of the information concerned from the reception controller 102.

In the transmission controller 105, the information of the MAC address of the partner wireless terminal with which the direct communication can be made is extracted from the address storage portion 104 or a notification of the information is received from the address storage portion 104. Concerning a frame out of transmission frames, the final destination of the frame concerned corresponding to the wireless terminal 102, the processing of generating the MAC header of the frame concerned for the direct communication or the processing of rewriting the MAC header of the frame concerned for the direct communication is carried out, and then the frame concerned is transmitted. In the construction of the MAC header of 802.11, the above processing corresponds to the processing of setting both ToDS bit and FromDS bit in the Frame Control field to "0" and writing the MAC address of the wireless terminal 102 into the write-in address field in which the direct transmission destination address is written.

Figure 11:
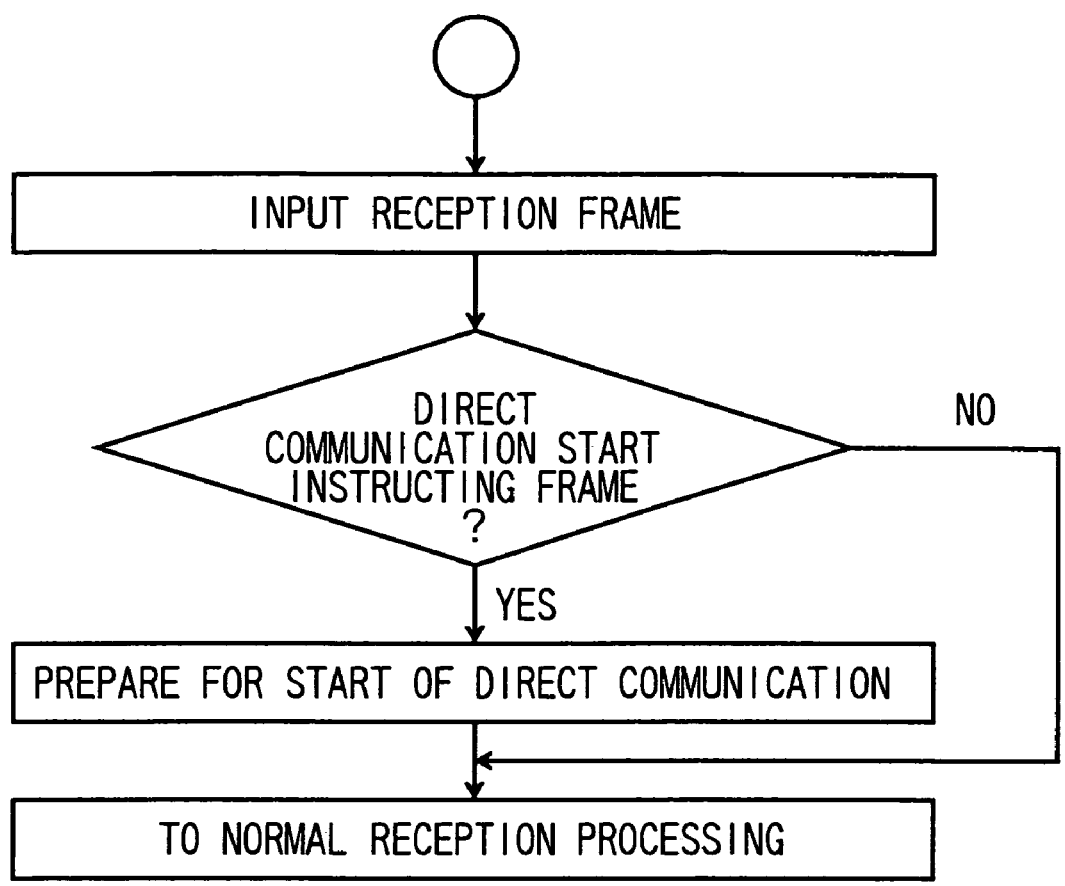
FIG. 11 is a flowchart showing the reception processing at the wireless terminal according to the twentieth embodiment.

FIG. 11 is a flowchart showing an example of the reception processing in the wireless terminal 101.

It is first judged whether the reception frame is a frame of instructing the start of the direct communication or not.

When the reception frame is not the frame for instructing the start of the direct communication, the processing of the normal reception frame is carried out. For example, it is judged whether the reception frame is addressed to the wireless terminal itself, and if so, the processing of generating and transmitting the acknowledgment frame corresponding to the reception frame is instructed to the transmission processor, and the data are delivered to the higher-level LLC (Logic Link Control) layer, etc.

On the other hand, if the reception frame is judged as being the frame of instructing the start of the direct communication, the start of the direct communication with the corresponding partner wireless terminal is prepared. The preparation of the start of the direct communication is the processing of holding the MAC address of the partner wireless terminal into the address storage portion 104 and generating or rewriting the MAC header of a frame whose final destination is the partner wireless terminal for the direct communication when the frame concerned is transmitted. Thereafter, the processing for the normal reception processing is carried out.

As described above, when the frame of instructing the start of the direct communication is received from the wireless base station, the actual direct communication can be started at the wireless terminal.

Twenty First Embodiment

This embodiment is basically based on the twentieth embodiment, and an additional point of this embodiment to the twentieth embodiment will be mainly described.

The additional point of this embodiment from the twentieth embodiment resides in that when the wireless terminal receives the frame of instructing the start of the direct communication from the wireless base station, the wireless terminal concerned starts the processing of starting the direct communication with the partner wireless terminal involved in the direct communication.

This will be described with reference to FIG. 3 of the first embodiment.

When the wireless terminal 101 receives the frame (1) of instructing the start of the direct communication from the wireless base station 1, a frame for actually starting the direct communication with the wireless terminal 102 is transmitted.

For example, when it is required that a predetermined request for starting a direct communication (based on a protocol defined in the IEEE 802.11 family or the like) is transmitted to the wireless terminal 102 through the wireless base station 1 in order for the wireless terminal 101 to start the direct communication with the wireless terminal 102, this procedure is carried out. Thereafter, for example, the wireless base station 1 transmits the direct communication start request frame from the wireless terminal 101 to the wireless terminal 102. The wireless terminal 102 judges whether the request concerned is accepted or not, and carries out predetermined frame exchange like it returns an acknowledgment to the wireless terminal 101 through the wireless base station 1 or the like. When the acknowledgment frame to the direct communication request frame indicates that the request is accepted, the direct communication is actually started between the wireless terminal 101 and the wireless terminal 102.

Through the above operation, the direct communication can be started according to the existing procedure of starting the direct communication.

Twenty Second Embodiment

This embodiment is basically based on the twenty first embodiment, and the different point of this embodiment from the twenty first embodiment will be mainly described hereunder.

The different point of this embodiment from the twenty first embodiment resides in that in the procedure of starting the direct communication by the wireless terminal, the frame of instructing the start of the direct communication is transmitted from the wireless base station to the partner wireless terminal involved in the direct communication.

When the partner wireless terminal receives the frame of instructing the start of the direct communication from the wireless terminal, it prepares for the direct communication with the wireless terminal concerned, so that the direct communication is started between the wireless terminals.

Through the above operation, when the frame of instructing the start of the direct communication from the wireless base station is received, the direct communication can be actually started at the wireless terminals and also the number of frames to be transmitted can be reduced as compared with the case where the procedure of starting the direct communication through the wireless base station again is carried out.

Twenty Third Embodiment

This embodiment basically relates to the operation at the wireless terminal side receiving the direct communication stop instruction frame from the wireless base station in the fourth to sixth, eleventh to fourteenth, seventeenth and eighteenth embodiments, however, this embodiment is basically based on the twentieth embodiment. Therefore, the different point of this embodiment from the twentieth embodiment will be mainly described.

The different point of this embodiment from the twentieth embodiment resides in that an instructing frame from the wireless base station relates to the stop of direct communication, and the processing of stopping the direct communication is carried out on the basis of the instructing frame.

When the wireless terminal receives the frame of instructing the stop of the direct communication from the wireless base station, it extracts the address information of the wireless terminal indicated in the frame of instructing the stop of the direct communication, and stops the processing of generating or rewriting the MAC header of the frame for direct communication.

Alternatively, when the partner wireless terminal making the direct communication is uniquely determined at the wireless terminal, it is unnecessary to write the address information of the partner wireless terminal in the frame of instructing the stop of the direct communication.

When the direct communication stop instructing frame is received from the wireless base station, the direct communication can be actually stopped at the wireless terminal as described above.

Twenty Fourth Embodiment

This embodiment is basically based on the twenty third embodiment, and an additional point of this embodiment to the twenty third embodiment will be described hereunder.

The additional point of this embodiment to the twenty third embodiment resides in that when the frame of instructing the stop of the direct communication from the wireless base station is received by the wireless terminal, the procedure of stopping the direct communication with the partner wireless terminal involved in the direct communication is started.

This will be described with reference to FIG. 1 of the first embodiment.

The wireless terminal 103 makes the direct communication with the wireless terminal 104, and when receiving the frame of instructing the stop of the direct communication from the wireless base station 1, the wireless terminal 103 transmits a frame for actually stopping the direct communication with the wireless terminal 104.

For example, when a predetermined direct communication stop request frame (based on a protocol defined in IEEE 802.11 family or the like) is required to be transmitted to the wireless terminal 104 through the wireless base station 1 in order for the wireless terminal 103 to actually stop the direct communication with the wireless terminal 104, this procedure is carried out. Thereafter, for example, the wireless base station 1 transmits the direct communication stop request frame from the wireless terminal 103 to the wireless terminal 104, and the direct communication between the wireless terminal 103 and the wireless terminal 104 is stopped.

Through the above operation, the direct communication can be stopped according to the existing procedure of stopping the direct communication.

Twenty Fifth Embodiment

This embodiment is basically based on the twenty fourth embodiment, and the different point of this embodiment from the twenty fourth embodiment will be described hereunder.

The different point of this embodiment from the twenty fourth embodiment resides in that as the procedure of actually stopping the direct communication by the wireless terminal, the frame of instructing the stop of the direct communication from the wireless base station is transmitted to the partner wireless terminal involved in the direct communication.

When the partner wireless terminal receives the frame of instructing the stop of the direct communication from the wireless base station concerned, it prepares for the stop of the direct communication with the wireless terminal concerned, so that the direct communication between the wireless terminals is stopped.

Through the above operation, when the frame of instructing the stop of the direct communication from the wireless base station is received, the direct communication can be actually stopped at the wireless terminals, and also the number of frames to be transmitted can be reduced as compared with the case where the procedure of stopping the direct communication through the wireless base station again is carried out.

Embodiments of Second Wireless Communication System

Next, a second wireless communication system constructed by a wireless base station 1 and plural wireless terminals (STA) will be described by using the following first to eighteenth embodiments with reference to the drawings.

First Embodiment

Figure 12:
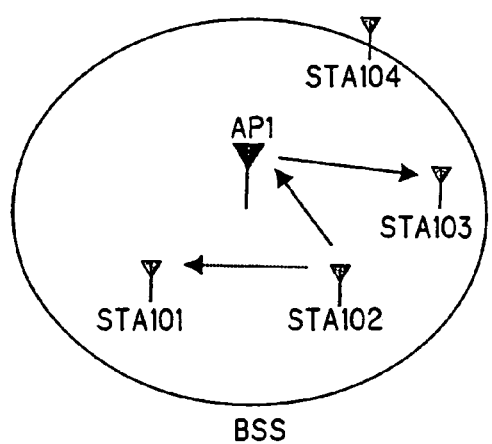
FIG. 12 is a diagram showing the construction of BSS comprising one wireless base station and plural wireless terminals according to a first embodiment in a second wireless communication system of the present invention.

FIG. 12 shows an example of a wireless LAN system of IEEE 802.11 adopting a communication style in which plural wireless terminals (STAs) 101 to 104 are wirelessly connected to one wireless base station (AP) 1. In IEEE 802.11, the constituent unit comprising one wireless base station and plural wireless terminals as described above is called as "BSS (Basic Service Set)".

The wireless terminal of this invention selects one of a communication mode via the wireless base station in the BSS and a direct communication mode with another wireless terminal in the BSS.

Figure 13:
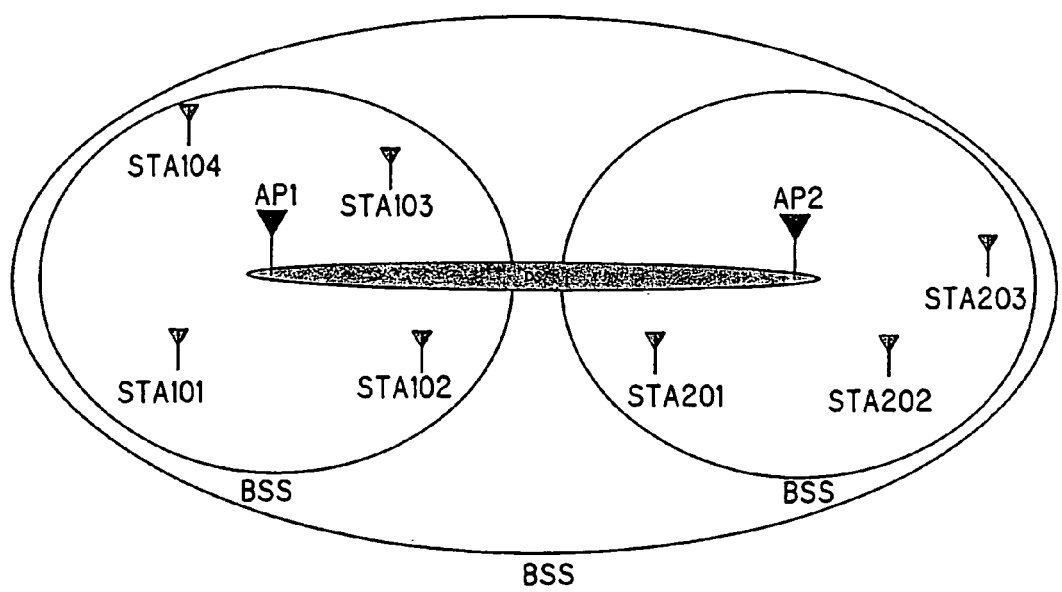
FIG. 13 is a diagram showing the construction of another wireless LAN system according to the first embodiment.

In FIG. 12, the wireless communication system is constructed by only one BSS, however, it may be constructed by plural BSSs as shown in FIG. 13. The constituent unit of the wireless communication system as described above is called as ESS (Extended Service Set) in IEEE 802.11. The relationship between wireless base stations is called as DS (Distributed System), and they may be connected by a wired or wireless infrastructure. Only one BSS or only a limited number of BSSs in the plural BSSs of the wireless communication system may be designed so as to support the direct communication between the wireless terminals.

This will be described with reference to FIG. 12.

When a wireless terminal 101 addresses and transmits data to a wireless terminal 102, the MAC address of the wireless terminal 102 is held to judge whether the wireless terminal 101 communicates with the wireless terminal 102 through the wireless base station 1 or directly communicates with the wireless terminal 102.

The case where the wireless terminal 102 carries out frame exchange with the wireless base station 1 may contain a case where the address of the data is just the wireless base station 1 and a case where data addressed to another wireless terminal 103 is transmitted through the wireless base station 1. Furthermore, it may contain a case where a destination wireless terminal to which data is addressed is out of the BSS itself. When the wireless base station 1 transmits a frame which requires an acknowledgment, for example, when in 802.11 the wireless base station 1 transmits a unicast data frame or a unicast management frame to the wireless terminal 102, the wireless terminal 102 receiving the transmitted frame from the wireless base station 1 transmits an ACK (Acknowledgment) frame as a control frame. When the wireless base station 1 transmits an RTS (Return to Send) frame as a control frame, the wireless terminal 102 receiving the RTS frame transmits a CTS (Clear to Send) frame as a control frame. In this case, the ACK or CTS frame thereof may be set as a frame addressed from the wireless terminal 102 to the wireless base station 1.

When the wireless terminal 101 filters received frames in the process of the reception processing, the wireless terminal 101 compares with the MAC address of the wireless terminal 102 held therein with the MAC address indicated in the transmission source address field of the MAC header portion of each reception frame, and if they are coincident with each other, the wireless terminal 101 can receive the frame from the wireless terminal 102, that is, the wireless terminal 101 can make the direct communication with the wireless terminal 102.

On the basis of this judgment, the wireless terminal 101 transmits to the wireless base station 1 a frame for requesting the wireless base station 1 to establish and set up the direct communication between the wireless terminal 101 and the wireless terminal 102 through the wireless base station 1. After the setup is completed, the wireless terminal 101 starts the direct communication with the wireless terminal 102.

Alternatively, on the basis of this judgment, the wireless terminal 101 may transmit data to the wireless terminal 102 through the direct communication, and start the direct communication.

FIG. 14 shows the construction of the transmitting and receiving portion in the wireless terminal 101.

The wireless terminal 101 comprises at least an antenna 100, a receiving portion 101, a reception controller 102, an information processor 103, an address storage portion 104, a transmission controller 105 and a transmitting portion 106. The address storage portion 104 may be provided as an external memory, or installed in the reception controller 102.

For example, when transmission data are createdby user's operation or instructed to be transmitted (a transmission request is generated) in the information processor 103, in response to this request, the information processor 103 transmits the transmission data to the transmission controller 105. This transmission data may be an IP packet, for example. The transmission controller 105 carries out predetermined transmission processing based on IEEE 802.11 (contains standards positioned as amendment, recommended practice, etc. of IEEE 801.11 standards such as IEEE 802.11a, IEEE 802.11b, IEEE 802.11d, etc.) such as generation of frames to be transmitted to a wireless base station or another wireless terminal in broadcast, multicast, unicast mode, etc. The digital data of thus-generated MAC frames which are defined in IEEE 802.11, for example, are converted to a wireless signal having a prescribed frequency through the transmitting portion 106, and then transmitted as a transmission signal from the antenna 100 to another wireless base station or wireless terminal.

The reception data input from the antenna 100 is subjected to the processing containing demodulation and decoding in the receiving portion 101 to generate a reception signal. The reception signal is input to the reception controller 102, and subjected to predetermined reception processing based on IEEE 802.11 (containing such as 802.11a and 802.11b). In the reception controller 102, the reception signal is converted to an MAC frame as digital data, and reception data are extracted from the data field in the MAC frame and delivered to the information processor 103. In this case, the information processor 103 carries out the processing of displaying the reception data on a display, etc. The information processor 103 may carry out various kinds of information processing as well as the above processing.

The wireless terminal 101 has the address storage portion 104 for holding the MAC address of the partner wireless terminal with which the wireless terminal 101 wishes to make direct communication. The address storage portion 104 notifies the held MAC address to the reception controller 102 and also it is used in a portion of the reception controller 102 which carries out filtering processing. MAC addresses of plural wireless terminals may be held in the address storage portion 104. The MAC addresses of the wireless terminals held in the address storage portion 104 are indicated by the information processor 103. Alternatively, the reception controller 102 and the transmission controller 105 may be interlocked with each other to hold the MAC address of all the wireless terminals that make communications.

When it is judged that the direct communication with the wireless terminal 102 can be started in the reception processing, the information processor 103 notifies it to the transmission controller 105. In the transmission controller 105, a frame that is addressed to the wireless base station 1 and requests the establishment of the direct communication with the wireless terminal 102 is generated, and transmitted from the antenna 100 through the transmitting portion 106. When an acknowledgment frame responding to the request frame for establishing the direct communication is received from the wireless base station 1, and if the acknowledgment indicates the success that the direct communication can be established, the transmission controller 105 carries out the processing of generating or rewriting the MAC header of a frame finally addressed to the wireless terminal 102 for the direct communication, and then transmits it. This processing is the processing of setting both of ToDS bit and FromDS bit in the Frame Control field to "0", writing the MAC address of the wireless terminal 102 into the write-in address field in which the transmission destination address is written, etc.

Alternatively, when the transmission controller 105 receives from the reception controller 103 a notification indicating that the direct communication with the wireless terminal 102 can be started, the transmission controller 105 may immediately carry out the processing of generating the MAC header of a frame out of transmission frames as an MAC header for the direct communication where the final destination of which corresponds to the wireless terminal 102, or the processing of rewriting the MAC header of the frame to an MAC header for the direct communication where the final destination of which corresponds to the wireless terminal 102.

Figure 15:
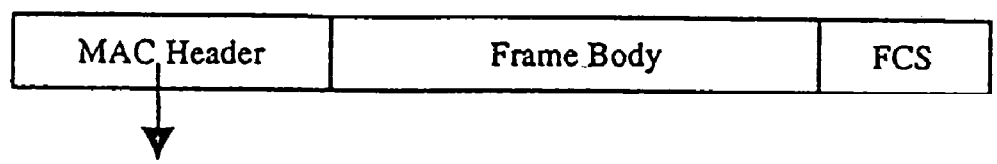
FIG. 15 is a diagram showing a representative MAC frame format of IEEE 802.11.

FIG. 15 shows the MAC frame format in the IEEE 802.11 wireless LAN system. The MAC frame comprises an MAC Header portion in which information required for the frame reception processing is indicated, an Frame Body portion in which information corresponding to the type of a frame, for example, data delivered from the higher-level LLC (Logic Link Control) layer, etc. are inserted, and an FCS (Frame Check Sequence) constructed by 32-bit CRC (Cyclic Redundancy Code) used to judge whether the MAC header portion and the Frame Body portion is correctly received. The MAC header portion contains an Frame Control field, a Duration/ID field indicating a period (NAV: Network Allocation Vector) for which the transmission is suppressed when a virtual carrier sense is executed, or indicating IDs (AID: Association Identifier) of wireless terminals allocated by the wireless base station, an MAC address field indicating the MAC addresses of the direct transmission destination, the final destination, and the transmission source (plural MAC address fields exist), a Sequence Control field indicating the Sequence number of data to be transmitted and Fragment number when fragmented, etc. The Frame Control field contains a Type field indicating the type of a frame, a Subtype field indicating the subtype of a frame, a ToDS bit indicating the addressing or non-addressing to DS (that is, the address to the wireless base station), a FromDS bit indicating transmission from DS (that is, the wireless base station) or not.

Figure 16:
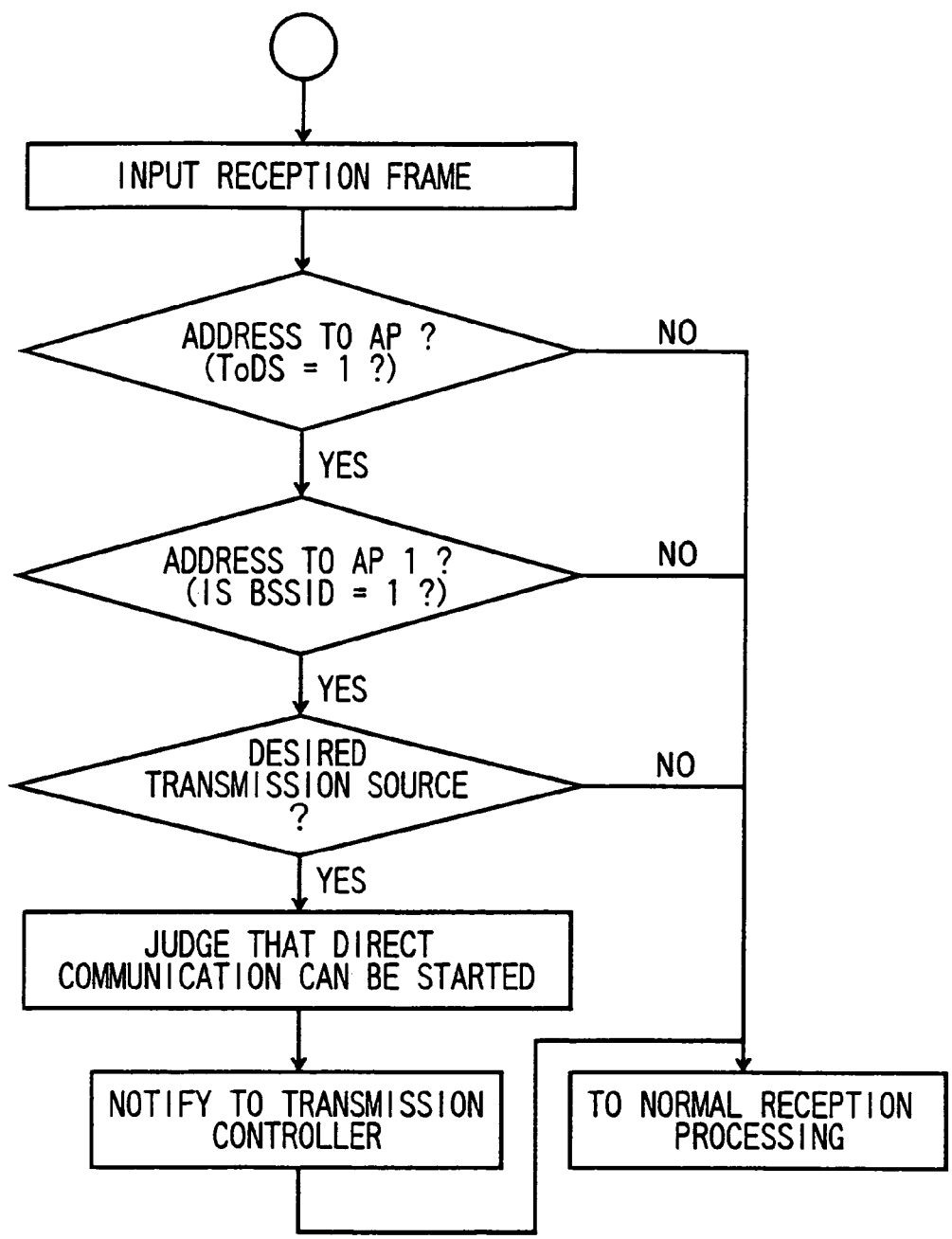
FIG. 16 is a flowchart showing the reception processing at the wireless terminal according to the first embodiment in the second wireless communication system.

FIG. 16 is a flowchart showing an example of the reception processing in the wireless terminal 101.

If it is judged that the reception frame is addressed to the wireless base station (this can be judged on the basis of the judgment as to ToDS bit is equal to "1") and then it is judged as being addressed to the wireless base station 1 (for example, in the construction of the BSS, it is defined so that the MAC address of the wireless base station is put in the BSS ID described in the address field portion of the wireless base station, and thus the judgment can be made on this), the transmission source MAC address of the reception frame and the MAC address held in the address storage portion are compared with each other. If this condition is not satisfied, the normal reception frame processing is carried out. The normal reception frame processing is, for example, when the reception frame is judged as a frame addressed to the wireless terminal itself, the processing of generating and transmitting an acknowledgment frame to the frame concerned being instructed to the transmission processor, and the processing of delivering the data to the higher-level LLC (Logic Link Control) layer, or when the reception frame is judged as a frame not addressed to the wireless terminal itself, the processing of setting a NAV and/or discarding the reception frame. On the other hand, if the above condition is satisfied, a notification indicating that the direct communication can be started is transmitted to the transmission processor. Thereafter, the normal reception frame processing is carried out.

As described above, by detecting the frame transmitted from the wireless terminal 102 on the basis of the reception frame, the wireless terminal 102 which can make the direct communication and is likewise connected to the wireless base station 1 to which the wireless terminal 101 is connected can be judged.

Second Embodiment

This embodiment is similar to the first embodiment, and thus the difference point of this embodiment will be mainly described.

The different point of this embodiment from the first embodiment resides in that not a frame transmitted to the wireless base station, but a frame transmitted from a wireless terminal making direct communication with another wireless terminal is observed.

Referring to FIG. 1, for example, when the wireless terminal 102 makes direct communication with the wireless terminal 103, if the wireless terminal 101 observes and receives the transmission frame from the wireless terminal 102, the wireless terminal 101 can judge that it is possible to make the direct communication with the wireless terminal 102.

Referring to FIG. 13, there may be such a situation that a frame transmitted from the wireless terminal 102 is observed when the wireless terminal 102 makes direct communication with a wireless terminal in another BSS, for example, a wireless terminal 201.

Furthermore, the different point of this embodiment from the first embodiment may contain a case where a frame transmitted from a wireless terminal communicating with a wireless base station of another BSS (not a wireless base station of the same BSS) is observed.

Referring to FIG. 13, in a case where the wireless terminal 102 observes and receives a transmission frame addressed from the wireless terminal 201 to a wireless base station of another BSS, that is, the wireless base station 2, the wireless terminal 102 can judge that it can make direct communication with the wireless terminal 201.

In the flowchart of FIG. 16, a portion for judging whether the frame is addressed to a wireless base station, and further it is addressed to the wireless base station 1 is not required.

As alternated, when the partner wireless terminal which the wireless terminal concerned wishes to directly communicate belongs to the BSS of the wireless terminal concerned, the direct communication can be established with the wireless base station being interposed. However, when the partner wireless terminal belongs to another BSS, both the wireless base station belonging to the BSS to which the wireless terminal concerned belongs and the wireless base station to which the partner wireless terminal belongs set up the direct communication. When the wireless terminal 101 judges that the direct communication can be performed, it can alternatively transmit data to the wireless terminal 102 without taking the step of setting up the direct communication, and starts the direct communication.

Through this operation, a wireless terminal can identify another wireless terminal with which the wireless terminal concerned can make direct communication. Furthermore, without limiting to the wireless terminal belonging to the same BSS, the wireless terminal which can be directly communicated can be detected.

Third Embodiment

This embodiment is basically similar to the first or second embodiment, and thus the different point of this embodiment from the first or second embodiment will be mainly described with reference to FIG. 17.

The different point of this embodiment from the first or second embodiment resides in that in order to make a desired wireless terminal transmit a frame to be observed, a frame whose final destination is the wireless terminal 102 is transmitted from the wireless terminal 101 through the wireless base station 1.

Figure 17:
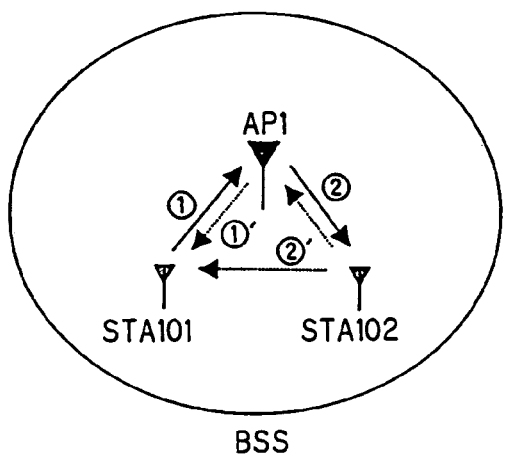
FIG. 17 is a diagram showing the construction of BSS comprising one wireless base station and plural wireless terminals according to a third embodiment in the second wireless communication system.

In FIG. 17, the wireless terminal 101 writes into the address field for the final destination of the MAC Header the MAC address of the wireless terminal 102 with which the wireless terminal 101 wishes to make direct communication, writes the MAC address of the wireless base station 1 (BSSID in IEEE 802.11) into the address field in which the direct transmission destination of the MAC Header is written, and transmits the frame (1). In IEEE 802.11, when the wireless base station 1 receives the frame (1), the wireless base station 1 transmits ACK frame (1)' serving as an acknowledgment frame to the wireless terminal 101.

When the wireless base station 1 judges that the final destination is a wireless terminal belong in the BSS to which the wireless base station 1 belongs, it rewrites the MAC Header portion of the frame (1), and transmits it as a frame (2) addressed to the wireless terminal 102. In IEEE 802.11, when the wireless terminal 102 receives the frame (2) from the wireless base station 1, it transmits ACK frame (2)' as an acknowledgment frame to the wireless base station 1. The subsequent processing to the observation of the frame (2)' from the wireless terminal 102 is the same as the first embodiment.

In the wireless terminal 101, after the ACK frame (1)' is received from the wireless base station 1, the transmission frame (2)' from the wireless terminal 102 may be observed. Through the above operation, only when there is a guarantee that there is a transmission frame from the wireless terminal 102 is high, the transmission frame from the wireless terminal 102 can be filtered, whereby the processing amount of the reception frame can be reduced.

Furthermore, there may be considered such a case where the wireless base station receives the frame (1) from the wireless terminal 101, judges that the final destination thereof is a wireless terminal which does not belong to the BSS of the wireless base station concerned or for which it is impossible to confirm whether the wireless terminal belongs to the BSS of the wireless base station concerned, and transfers the frame (1) through DS to a wireless base station of another BBS.

Figure 18:
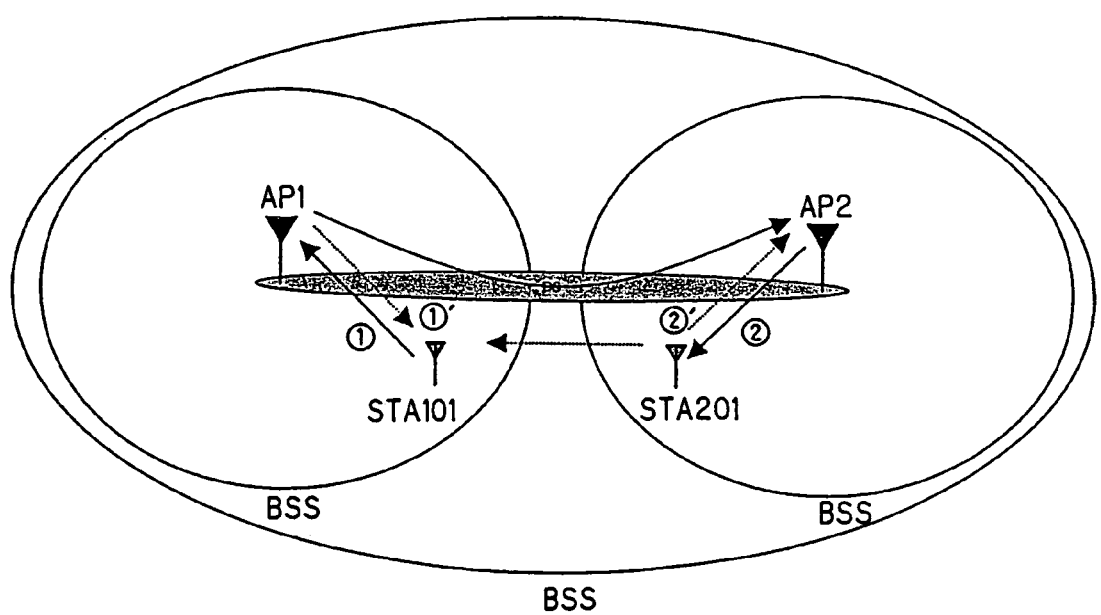
FIG. 18 is a diagram showing the construction of another wireless LAN system according to the third embodiment.

This will be described with reference to FIG. 18. The wireless terminal 101 transmits the frame (1) of the wireless terminal 201 as the final destination to the wireless base station 1, and the wireless base station 1 transmits the frame concerned to the wireless base station 2 through the DS. When the wireless base stations are connected to each other wirelessly, the MAC Header portion of the frame (1) is rewritten, and the frame is transmitted to the wireless base station 2. In the wireless base station 2, when it is judged that the wireless terminal 201 as the final destination of the frame is a wireless terminal belonging to the BSS of the wireless base station 2, the wires base station 2 rewrites the MAC Header portion of the frame and transmits it as the frame (2) to the wireless terminal 201. When the wireless terminal 201 receives the frame (2), the wireless terminal 201 transmits ACK frame (2)' as an acknowledgment frame to the wireless base station 2.

The processing subsequent to the observation of the frame (2)' from the wireless terminal 201 is the same as the second embodiment.

In the wireless terminal 101, the transmission frame (2)' from the wireless terminal 201 may be observed after the ACK frame (1)' from the wireless base station 1 is received.

Through the above operation, only when there is a guarantee that there is a transmission frame from the wireless terminal 201 is high, the transmission frame from the wireless terminal 201 is filtered, whereby the processing amount of the reception frame can be reduced.

In order to observe a frame transmitted from a desired wireless terminal, a frame to be transmitted from a wireless terminal which judges whether direct communication is possible or not may be data addressed to the desired wireless terminal which is delivered from the LLC in the wireless terminal concerned.

A frame having no Frame Body portion (called as Null frame in IEEE 802.11) may be transmitted in such a case that it is judged whether it is possible to make direct communication with the desired wireless terminal during a period when there is no data addressed to the desired wireless terminal or the like.

In this embodiment, the method of making the judgment based on the frame transmission in the MAC layer and the acknowledgment thereto has been described, however, the present invention is not limited to this method. The data transmission in a higher-level layer, for example, the TCP/IP layer and the acknowledgment thereto may be observed.

Through the above operation, it can be judged whether a wireless terminal can make direct communication with a desired wireless terminal out of wireless terminals which are likewise connected to a wireless base station to which the wireless terminal concerned is connected, and the judgment can be made even when the desired wireless terminal has no communication at that time.

Fourth Embodiment

This embodiment is basically based on the third embodiment, and an additional point of this embodiment to the third embodiment will be mainly described.

The additional point of this embodiment to the third embodiment is as follows. That is, in addition to the observation of the acknowledgment frame from the wireless terminal to the wireless base station in the third embodiment, when the wireless base station communicates with the wireless terminal by using a beam having directivity, in order to check whether a desired wireless terminal serving as a partner wireless terminal for direct communication is located within the same beam from the wireless base station, a transfer frame from the wireless base station which serves as an origin of the acknowledgment frame thereof is also observed. This is shown in FIG. 19.

Figure 19:
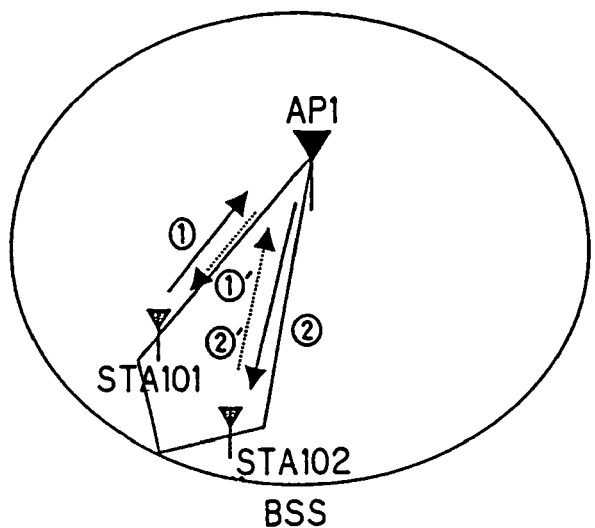
FIG. 19 is a diagram showing the construction of BSS comprising one wireless base station and plural wireless terminals that are wirelessly connected to the wireless base station according to a fourth embodiment in the second wireless communication system.

In FIG. 19, when the wireless terminal 101 observes and receives the transfer frame (2) transmitted from the wireless base station and the acknowledgment frame (2)' to the transfer frame from the wireless terminal 102, the wireless terminal 101 judges that the direct communication with the wireless terminal 102 is possible.

The subsequent processing is the same as the third embodiment.

Even in the communication mode that no directional beam is used between the wireless base station and the wireless terminal as shown in the third embodiment, it may be checked whether the wireless base station transfers the frame which is transmitted from the wireless terminal and addressed to the desired wireless terminal. Accordingly, for example, when the wireless terminal receiving the frame transferred from the wireless base station observes an immediately transmitted response frame (ACK frame or the like in IEEE 802.11), the timing thereof can be predicted, and the observation of the desired acknowledgment frame can be efficiently performed.

Through the above operation, even when the wireless base station communicates with the wireless terminal by using the directional beam, it can be judged whether a wireless terminal is located in the same as or in the neighboring of a desired wireless terminal out of wireless terminals which are likewise connected to a wireless base station to which the wireless terminal concerned is connected, and suitable for direct communication.

Fifth Embodiment

This embodiment is basically based on the fourth embodiment, and the different point of this embodiment from the fourth embodiment will be mainly described.

The different point of this embodiment from the fourth embodiment resides in that no directional beam is used between the wireless base station and the wireless terminal.

The situation is changed from that of FIG. 19 to that of FIG. 17. In FIG. 17, when the wireless terminal 101 observes and receives the transfer frame (2) transmitted from the wireless base station and the acknowledgment frame (2)' to the transfer frame from the wireless terminal 102, the wireless terminal 101 judges whether the direct communication with the wireless terminal 102 is possible.

The subsequent processing is the same as the third embodiment.

It may be also checked whether the frame transmitted from the wireless terminal and addressed to the desired wireless terminal may be transferred by the wireless base station. With this check, for example when the wireless terminal receiving the frame transferred from the wireless station observes an immediately transmitted acknowledgment frame (ACK frame or the like in IEEE 802.11), the timing thereof can be predicted the observation of the desired response frame can be efficiently performed.

Through the above operation, in the third embodiment that no directional beam is used between the wireless base station and the wireless terminal, the desired response frame can be efficiently observed even when it is checked whether the wireless base station transfers the frame transmitted from the wireless terminal and addressed to the desired wireless terminal as in the case of this embodiment.

Sixth Embodiment

This embodiment is basically based on the first to fifth embodiments, and thus an additional point of this embodiment to the first to fifth embodiments will be mainly described hereunder.

The additional point of this embodiment to the first to fifth embodiments resides in that a frame is received from a desired wireless terminal or a desired wireless base station (in the fourth and fifth embodiments) and the reception electric field intensity of the reception frame is used when it is judged whether direct communication is possible or not.

This will be described with reference to FIG. 17 of the third embodiment. The wireless terminal 101 sets the threshold value of the reception electric field so that it is judged that the direct communication is possible if the reception electric field intensity of the reception frame is equal to or larger than some value. When the wireless terminal 101 receives a frame (2)' during observation of a frame from the wireless terminal 102, the wireless terminal 101 compares the reception electric field intensity of the frame (2)' with the threshold value. If the reception electric field intensity of the frame (2)' is equal to or larger than the threshold value, the wireless terminal 101 judges that the direct communication is possible. The subsequent processing is the same as the third embodiment. The threshold value may be set to the power value of the actual reception electric field intensity or a level value determined on the basis of some rule. In order to calculate a statistical reception electric field intensity, the reception frame from the desired wireless terminal (and the wireless base station) may be observed at plural times to calculate an average value, whereby the judgment is made on the basis of the average value.

Through the above operation, the judgment as to whether the direct communication is possible or not in the first to fifth embodiments can be more clarified.

Furthermore, the wireless communication link state between the two wireless terminals involved in the direct communication can be estimated, and the actual connectable probability and the communication quality at the connection time can be enhanced.

Seventh Embodiment

This embodiment is basically based on the first to fifth embodiments, and an additional point of this embodiment to the first to fifth embodiment will be mainly described.

The additional point of this embodiment to the first to fifth embodiments resides in that a frame is received from a desired wireless terminal or a desired wireless base station (in the fourth and fifth embodiments) and the error rate of the reception frame is used when it is judged whether direct communication is possible or not.

The error rate may be a bit error rate, a packet error rate or a frame error rate in the PHY layer, or a CRC error in the MAC layer may be used, for example.

In the bit error rate, the packet error rate or the frame error rate, a reference rate for judging whether direct communication is possible or not is settled, and the judgment that the direct communication is possible is made when the error rate corresponding to the received frame is lower than the reference rate. In order to determine the frame reference rate, the reception frame from the desired wireless terminal (and the wireless base station) may be observed at plural times. Referring to FIG. 17 of the third embodiment, when the wireless terminal 101 transmits frames (1) at plural times, and observes and receives plural frames (2)' from the wireless terminal 102, for example the frame error rate is compared with the reference rate, and when the frame error rate is lower than the reference rate, the wireless terminal 101 judges that the direct communication is possible. The frames (1) transmitted at plural times from the wireless terminal 101 may be the same data or different data. Furthermore, the frames (2) transmitted at plural times from the wireless terminal 102 are not limited to the same frame in accordance with the frame (1).

In the CRC error, for example if the received frame is an CRC error, there is made no judgment as to whether direct communication is possible.

The processing subsequent to the judgment as to whether the direct communication is possible is the same as the first to fifth embodiments.

Through the above operation, the judgment as to whether the direct communication is possible or not can be made by adding the quality of the direct communication to the first to fifth embodiments.

By combining this embodiment with the sixth embodiment, the judgment as to whether the direct communication is possible or not can be more clarified in the first to fifth embodiments, and the quality of the direct communication can be added.

Eighth Embodiment

This embodiment is basically based on the first embodiment, and the different point of this embodiment from the first embodiment will be mainly described.

The different point of this embodiment from the first embodiment resides in that the wireless terminal does not judge whether the direct communication with the desired wireless terminal is possible or not, but when the wireless base station receives a request frame for direct communication from the wireless terminal, the wireless base station judges whether the request should be allowed or not.

This will be described with reference to FIG. 20.

When the wireless terminal 101 and the wireless terminal 102 make wireless communication with each other, the wireless base station 1 holds the reception frame information of reception frames from the wireless terminal 101 and the wireless terminal 102, and when the wireless base station 1 receives from the wireless terminal 101 a direct communication request frame (3) with the wireless terminal 102, the wireless base station 1 judges on the basis of the reception frame information whether the request of the frame (3) is allowed or not.

In this embodiment, the reception electric field intensities of the reception frames are particularly used as the reception frame information.

The wireless base station 1 sets and stores a threshold value of the reception electric field intensity so that it allows the request of a direct communication request frame (3) with the wireless terminal 102 from the wireless terminal 101 at the reception time of the direct communication request frame (3) from the wireless terminal 101 under the state that the reception electric field intensities of the reception frames from the wireless terminal 101 and the wireless terminal 102 are equal to or larger than some value. When observing each of the reception frames from the wireless terminal 101 and the wireless terminal 102, the wireless base station 1 compares the reception electric field intensity of each reception frame with the threshold value, and allows the direct communication between the wireless terminals 101 and 102 if both the reception electric field intensities of the reception frames are equal to or larger than the threshold value. The threshold value may be an actual power value of the reception electric field intensity, or a level value determined on the basis of some rule. Furthermore, in order to determine an electrostatic reception electric field intensity, reception frames from a desired wireless terminal may be observed at plural times to calculate an average value and make a judgment on the basis of the average value.

With respect to the wireless terminal 101 transmitting the wireless communication request frame (3), the reception frame information of the frame (3) itself may be used.

Accordingly, the wireless communication link state between the wireless base station and each of the two wireless terminals is excellent (the two wireless terminals exist in the neighborhood of the wireless base station and the reception electric field intensities thereof at the wireless base station are high, or the electric wave propagation state between the wireless base station and each of the wireless terminals is excellent), and thus it can be estimated that the wireless communication link state between the two wireless terminals is also excellent, so that it can be judged at the wireless base station that the direct communication between the two wireless terminals is possible.

Figure 21:
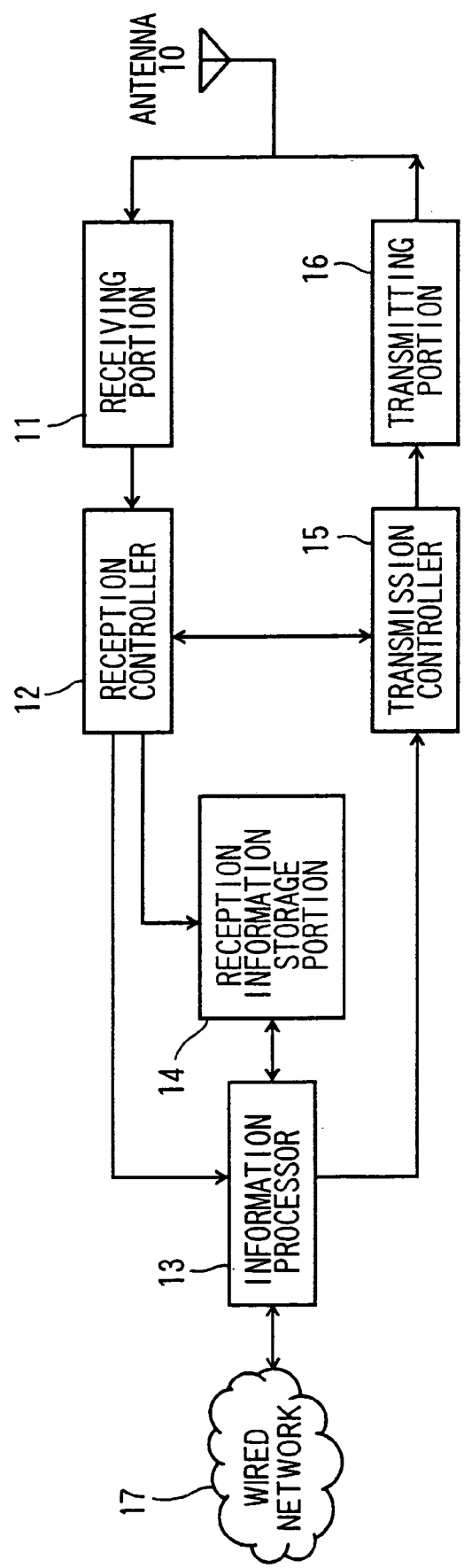
FIG. 21 is a diagram showing the construction of the transmitting and receiving portion of the wireless base station according to the eighth embodiment.

FIG. 21 shows the construction of the transmitting and receiving portion in the wireless base station 1.

The wireless base station 1 comprises at least an antenna 10, a receiving portion 11, a reception controller 12, an information processor 13, a reception information storage portion 14, a transmission controller 15 and a transmitting portion 16. The reception information storage portion 14 may be provided as an external memory, or installed in the reception controller 12.

When transmission data is created or instructed to be transmitted (a transmission request occurs) by user's operation, in response to this instruction, the information processor 103 delivers the transmission data to the transmission controller 15. The transmission data may be an IP packet, for example. The transmission controller 15 carries out predetermined transmission processing based on IEEE 802.11 (containing such as IEEE 802.11a and IEEE 802.11b) such as generation of a frame to be transmitted to another wireless base station or wireless terminal in broadcast, multicast or unicast mode, etc. The digital data of an MAC frame which is generated here and defined in IEEE 802.11, for example, is converted to a wireless signal having a predetermined frequency through the transmitting portion 16, and then transmitted as a transmission signal from the antenna 10 to another wireless base station or wireless terminal. The information processor 103 may be connected to a wired network 17. When data are input from the wired network, if the data concerned is addressed to another wireless base station (and also the information processor 103 has information with which it can wirelessly connect to the wireless base station) or the data concerned is addressed to another wireless terminal (and also the wireless terminal concerned belongs to the same BSS), the data are likewise processed and output as a transmission signal to the wireless base station or to the wireless terminal.

The reception data input from the antenna 10 are subjected to the processing containing demodulation and decoding in the receiving portion 11 to generate a reception signal. When the reception signal is input to the reception controller 12, for example, predetermined reception processing based on IEEE 802.11 (containing 802.11a and 802.11b) or the like is conducted on the reception signal. In the reception controller 12, the reception signal is converted to an MAC frame as digital data, and reception data are extracted from the data field in the MAC frame and delivered to the information processor 13. In this case, the information processor 13 carries out the processing of displaying the reception data on a display or the like. The information processor 13 may carry out various kinds of information processing in addition to the above processing. Furthermore, the information processor 13 may be connected to the wired network 17, and when the reception data is addressed to another terminal such as another wireless base station or the like which is connected on the wired network 17, the data are addressed and output to the wired network 17 from the information processor 13.

The wireless base station 1 has a reception information storage portion 14, and when the wireless base station 1 receives a request frame (3) for direct communication, the wireless base station 1 judges through the reception information storage portion 14 whether the request frame is allowed or not, and collects the reception information of frames received from the reception controller 12. At least the identifiers of wireless terminals, for example, the MAC addresses of the wireless terminals are held as the reception information. In the reception information storage portion 14, only the collection of the reception information on the MAC addresses of a limited number of wireless terminals may be carried out. In this case, the reception information of the wireless terminals collected in the reception information storage portion 14 may be indicated from the information processor 13. Furthermore, the reception information of all the wireless terminals which are received by the reception controller 12 may be held.

In this embodiment, it is held as reception information together with the identifier of the wireless terminal, for example, the MAC address of the wireless terminal whether the reception electric field intensity of the received frame is equal to or larger than the threshold value. As described above, reception frames from the desired wireless terminal may be observed at plural times to calculate the average value thereof and it may be held as reception information whether the average value is equal to or larger than the threshold value, whereby the judgment is made by adding statistical processing.

When receiving the request frame (3) for the direct communication from the wireless terminal 101, the frame concerned is notified through the reception controller 12 to the information processor 13. The information processor 13 achieves from the reception information storage portion 14 reception information indicating whether the respective past reception frames of the two wireless terminals involved in the direct communication, that is, the wireless terminals 101 and 102, are equal to or larger than the threshold value of the reception electric field intensity for allowing the direct communication, and judges on the basis of this reception information whether the request of the frame (3) is allowed or not. Furthermore, when there is no reception of the wireless terminal 102, the request concerned is rejected. When the request is rejected, the information processor 13 notifies the transmission controller 15 to generate a frame (4) for rejecting the request as a response frame to the request frame (3) of the wireless terminal 101. The transmission controller 15 generates a frame which is addressed to the wireless terminal 101 and notifies the rejection of the request for the direct communication, and transmits it through the transmitting portion 16 from the antenna 10. when the information processor 13 judges that the request from the wireless terminal 101 is allowed, the information processor 13 notifies the transmission controller 15 to generate a frame required to establish the direct communication between the wireless terminal 101 and the wireless terminal 102, and transmits the direct communication establishing frame from the antenna 10 through the transmitting portion 16.

Figure 22:
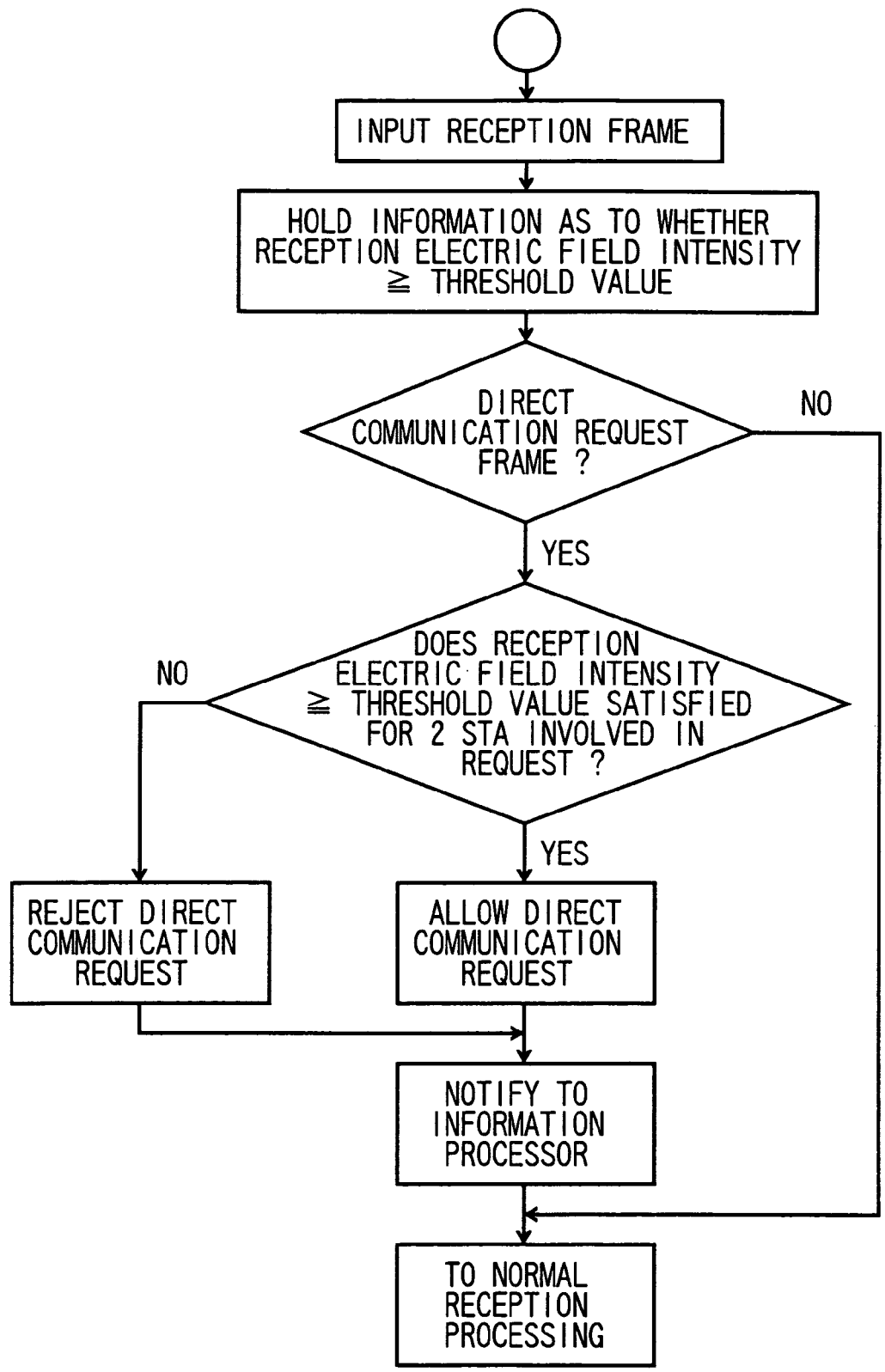
FIG. 22 is a flowchart showing the reception processing at the wireless base station according to the eight embodiment.

FIG. 22 is a flowchart showing the processing when frames containing the request frame (3) for the direct communication are received in the wireless base station 1.

When a frame is received and the frame concerned is transmitted from a desired wireless terminal, it is judged whether the reception electric field intensity of the frame is equal to or larger than the threshold value of the reception electric field intensity for allowing the direct communication, and when it is judged that the reception electric field intensity of the frame is larger than the threshold value, the information concerned is held.

When it is judged that the reception frame is the direct communication request frame (3), it is checked whether the reception electric field intensities of the past reception frames from the two wireless terminals involved in the request are equal to or larger than the threshold value of the reception electric field intensity for allowing the direct communication. If both the reception electric field intensities are equal to or larger than the threshold value, the wireless base station 1 judges that the direct communication request from the wireless terminal 102 is allowed, notifies the judgment result to the information processor 13 and carries out the normal reception frame. Thereafter, it transmits a frame required for establishing the direct communication. When the reception electrical field intensity of the reception frame is lower than the threshold value at either one of the wireless terminals, the wireless base station 1 judges that the direct communication request from the wireless terminal 102 is rejected (torn down), notifies the judgment result to the information processor 13 and likewise carries out the normal reception processing. Thereafter, it transmits a frame (4) for rejecting the request as a response to the direct communication request frame (3).

As described above, with respect to the direct communication request from the wireless terminal as described above, the wireless base station allows or rejects the request concerned, whereby the wireless base station can intervene in the establishment of the direct communication between the wireless terminals, and at the same time the wireless communication link state between the two wireless terminals involved in the direct communication can be estimated, so that the actual connectable probability and the communication quality at the connection time can be enhanced.

Ninth Embodiment

This embodiment is basically based on the eighth embodiment, and an additional point of this embodiment to the eighth embodiment will be mainly described.

An additional point of this embodiment from the eighth embodiment resides in that when a frame is received from a desired wireless terminal and it is judged whether direct communication is possible, the presence or absence of responses to frames transmitted from the wireless base station 1 to each wireless terminal for some fixed period is used as reception frame information in combination.

Furthermore, the fact that a frame is received from each wireless terminal for some fixed period may be used as the reception frame information.

This will be described with reference to FIG. 20 of the eighth embodiment. For example, when the presence or absence of the reception information is held, the reception frame information of the wireless terminal concerned is cleared if the reception information is not renewed by a new reception frame for some fixed period.

When the request frame (3) for the direct communication with the wireless terminal 102 is received from the wireless terminal 101, if there are reception frames from the wireless terminals 101 and 102 involved in the direct communication within the fixed period, this means that there is reception frame information and thus this embodiment is the same as the eighth embodiment in which the judgment is made by comparing the reception electric field intensity. If there is no response from either one of the wireless terminals within the fixed period, this means that there is no reception frame information, and thus the frame (4) for rejecting the request of the frame (3) is transmitted.

The reception frame information added with the presence or absence of the acknowledgment within the fixed period may be used for only the wireless terminal 102 which is required as a partner for the direct communication. However, with respect to the wireless terminal 101 transmitting the wireless communication request frame (3), the reception frame information of the frame (3) itself may be used for the wireless terminal 101.

The construction of the transmitting and receiving portion in the wireless base station 1 is the same as that of FIG. 21 in the eighth embodiment. However, the reception information storage portion 14 operates as follows.

When a new reception frame is received from a wireless terminal collecting reception information, the reception information is renewed. After the renewal, when the reception information at some wireless terminal collecting reception information is not renewed for a fixed period, it is judged that there is no reception information on the wireless terminal in the reception information storage portion 14. When there is an inquiry from the information processor 13, a response indicating no reception information is made. The information processor 13 notifies the transmission controller 15 to generate a frame for rejecting the request as an acknowledgment frame to the direct communication request frame (3), and transmits the frame for rejecting the request from the antenna 10 through the transmitting portion 16.

The judgment processing to the direct communication request frame (3) in the wireless base station 1 is the same as that of FIG. 22 in the eighth embodiment, however, the comparison information between the reception electric field intensity of the past reception frame of each of the two wireless terminals involved in the direct communication and the threshold value is held for only some fixed period.

Through the above operation, the guarantee period for the reception frame information in the eighth embodiment is provided, and the reliability of the information is more enhanced, so that the estimation precision of the wireless communication link state between the two wireless terminals involved in the direct communication can be enhanced.

Tenth Embodiment

This embodiment is basically based on the eighth embodiment, and the different point of this embodiment from the eighth embodiment will be mainly described.

The different point of this embodiment from the eighth embodiment resides in that when the wireless base station receives a frame from a desired wireless terminal and judges whether direct communication is possible or not, the error rate of the reception frame is particularly used.

The error rate may be a bit error, a packet error rate or a frame error rate in the PHY layer, or a CRC error in the MAC layer may be used, for example.

This will be described with reference to FIG. 20 of the eighth embodiment. With respect to the bit error rate, the packet error rate or the frame error rate, a reference rate for allowing direct communication is settled, and it is stored that the direct communication between the wireless terminal 101 and the wireless terminal 102 is allowed when both the corresponding error rates of frames received from the wireless terminal 101 and the wireless terminal 102 are lower than the reference rate. When the request frame (3) for the direct communication with the wireless terminal 102 is received from the wireless terminal 101, the request of the frame (3) is allowed. In order to determine the frame error rate, the wireless base station may observe reception frames from the desired wireless terminal at plural times. The wireless terminal 101 transmits the frames (1) at plural times, and the wireless base station observes the frames (2) from the wireless terminal 102 at plural times, compares, for example, the frame error rate at the reception time with the reference rate, and judges that the direct communication is possible when the frame error rate is lower than the reference rate. The frames (1) transmitted from the wireless terminal 101 at plural times may be the same data, or different data. The frames (2) transmitted from the wireless terminal 102 at plural times are not limited to be the same frame in accordance with the frames (1).

In the CRC error, if the frame thus received is a CRC error, no judgment as to whether the direct communication is possible is made.

The construction of the transmitting and receiving portion in the wireless base station 1 is the same as that of FIG. 21 in the eighth embodiment. However, in the reception information storage portion 14, the judgment based on the error rate in place of the reception electrical field intensity is made.

In the judgment processing to the direct communication request frame (3) in the wireless base station 1, the different point from FIG. 22 in the eighth embodiment resides in that in place of the comparison between the reception electrical field of each of the past reception frames of the two wireless terminals involved in the direct communication and the threshold value, it is judged whether the error rate of each of the past reception frames of the two wireless terminals involved in the requested direct communication is lower than the allowance threshold value.

The subsequent processing to the judgment as to the direct communication is the same as the eighth embodiment.

Alternatively, the judgment of the eighth embodiment and the judgment concerning the error rate may be combined with each other. Furthermore, the judgment concerning the error rate may be added to the ninth embodiment.

Through the above operation, the wireless base station judges allowance or rejection to the direct communication request from the wireless terminal, whereby the wireless base station involves in the establishment of the direct communication between the wireless terminals, and also estimates the wireless communication link state between the two wireless terminals involved in the direct communication by using the information on the error rates of the reception frames, whereby the actual connectable probability and the communication quality at the connection time can be enhanced.

Furthermore, by combining this embodiment with the eighth embodiment, the estimation precision of the wireless communication link state between the two wireless terminals involved in the direct communication can be enhanced.

Furthermore, by combining this embodiment with the ninth embodiment, the wireless communication link state between the two wireless terminals involved in the direct communication can be estimated while the guarantee period for the information on the error rate of the reception frame is added.

Eleventh Embodiment

This embodiment is basically based on the eighth embodiment, and the different point of this embodiment from the eighth embodiment will be mainly described.

The different point of this embodiment from the eight embodiment resides in that in order for the wireless base station to judge whether the direct communication request frame from the wireless terminal is allowed or not when receiving the direct communication request, the information on the reception frames from the wireless terminals is not used, but the directions of the directional beams directed to the two wireless terminals associated with the request are used.

Figure 20:
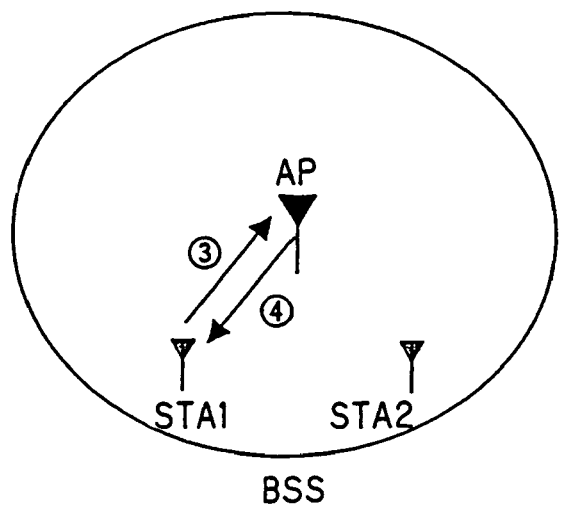
FIG. 20 is a diagram showing the construction of BSS comprising one wireless base station and plural wireless terminals that are wirelessly connected to the wireless base station according to an eighth embodiment in the second wireless communication system.
Figure 23:
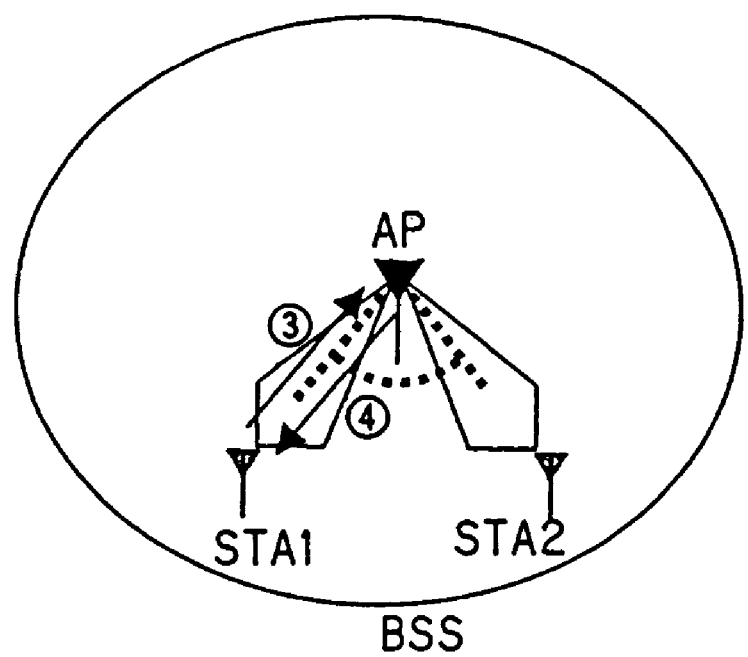
FIG. 23 is a diagram showing the construction of BSS comprising one wireless base station and plural wireless terminals that are wirelessly connected to the wireless base station according to an eleventh embodiment in the second wireless communication system.

In this embodiment, the construction of BSS is changed from that of FIG. 20 of the eighth embodiment to that of FIG. 23. In this communication style, the wireless base station 1 communicates with each of the wireless terminals 101 and 102 by using directional beams.

When the wireless base station 1 communicates with each of the wireless terminal 101 and the wireless terminal 102 while directing a directional beam to each of the wireless terminals 101 and 102, the wireless base station 1 holds the information on the directions of the directional beams directed to the respective wireless terminals 101 and 102. When receiving the request frame (3) of the direct communication with the wireless terminal 102 from the wireless terminal 101, the wireless base station 1 judges on the basis of the directions of the directional beams whether the request of the frame (3) is allowed or not. If rejecting (tearing down) the request, the wireless base station 1 notifies the wireless terminal 101 of the rejection to the request as a response to the request frame (3) by using the frame (4).

As described above, by determining the angle difference between the directional beams directed to the two wireless terminals when viewed from the wireless base station, the distance between the two wireless terminals can be approximately estimated on the basis of the above information and the radius of the area covered by the wireless base station, and the judgment as to whether the two wireless terminals can make direct communication can be performed at the wireless base station side.

Figure 24:
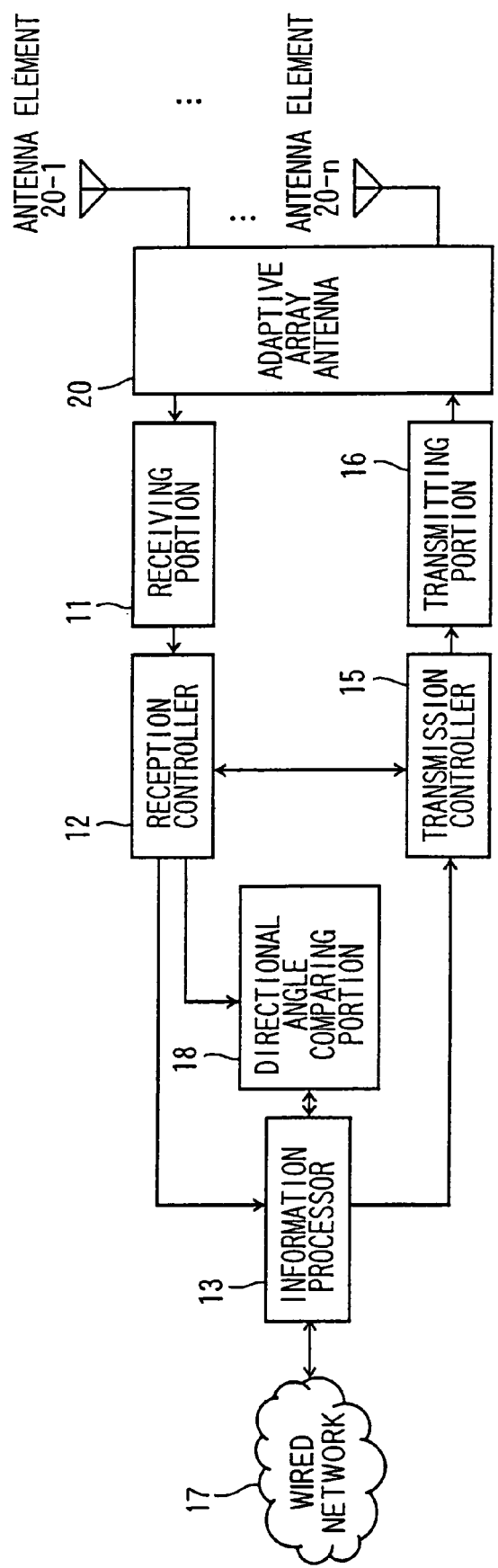
FIG. 24 is a diagram showing the construction of the transmitting and receiving portion of the wireless base station according to the eleventh embodiment.

FIG. 24 shows the construction of the transmitting and receiving portion in the wireless base station 1. The different point of this embodiment from that of FIG. 21 in the eighth embodiment resides in that an adaptive array antenna 20 is used so as to form directional beams in place of the antenna 10, and also a directional angle comparing portion 18 for comparing the directions of the directional beams to the respective wireless terminals is used in place of the reception information storage portion 14.

In the judgment processing to the direct communication request frame (3) at the wireless base station 1, the different point from that of FIG. 22 in the eighth embodiment resides in that in place of the checking the presence or absence of the reception information of the request destination (a wireless terminal with which the direct communication is requested to be made), the directions of the directional beams directed to both the wireless terminals involved in the direct communication thus requested are compared with each other.

As described above, the wireless base station judges allowance or rejection to the direct communication request from the wireless terminal, whereby the wireless base station can intervene in the establishment of the direct communication between the wireless terminals, and also the actual connectable probability between the two wireless terminals involved in the direct communication and the communication quality at the connection time can be enhanced by using the information on the directions of the directional beams.

Twelfth Embodiment

This embodiment is basically based on the eleventh embodiment, and a supplementary point of this embodiment to the eleventh embodiment will be mainly described.

The supplementary point of this embodiment to the eleventh embodiment resides in that a directional beam angle difference for allowing the direct communication request is determined as information on the direction of the directional beam, and the judgment is made on the basis of the directional beam angle difference thus determined.

This will be described with reference to FIG. 23 of the eleventh embodiment. When the wireless base station 1 receives the direct communication request frame (3) with the wireless terminal 102 from the wireless terminal 101, the wireless base station 1 calculates the angle difference between the directional beams directed to the respective wireless terminals 101 and 102, and when the angle difference is smaller than the angle difference for allowing the direct communication request, the wireless base station 1 transmits a frame required to establish the direct communication between the wireless terminals 101 and 102. When the angle difference is equal to or larger than the angle difference for allowing the direct communication, the wireless base station 1 transmits the frame (4) for rejecting the request as a response frame to the request frame (3) of the wireless terminal 101.

As described above, the wireless base station makes the judgment as to allowance or rejection to the direct communication request from each wireless terminal, whereby the wireless base station can intervene in the establishment of the direct communication between wireless terminals. At the same time, the above judgment is more clarified by using the information on the directions of the directional beams to enhance the actual connectable probability between two wireless terminals involved in the direct communication and the communication quality at the connection time.

Thirteenth Embodiment

This embodiment is basically based on the eleventh embodiment, and a supplementary point of this embodiment to the eleventh embodiment will be mainly described.

The supplementary point of this embodiment to the eleventh embodiment resides in that a directional beam angle for rejecting the direct communication request is determined as the information on the direction of the directional beam and the judgment is made on the basis of this information.

This will be described with reference to FIG. 23 of the eleventh embodiment. When the wireless base station 1 receives the direct communication request frame (3) with the wireless terminal 102 from the wireless terminal 101, the wireless base station 1 achieves the angle difference between the directional beams directed to the respective wireless terminals 101 and 102. When the angle difference thus achieved is equal to or larger than the angle difference for rejecting the direct communication request, the wireless base station transmits the frame (4) for rejecting the direct communication request as a response frame to the request frame (3) of the wireless terminal 101. When the angle difference is smaller than the angle difference for rejecting the direct communication request, the wireless base station 1 transmits a frame required to establish the direct communication between the wireless terminal 101 and the wireless terminal 102.

As described above, the wireless base station makes the judgment as to allowance or rejection to the direct communication request from each wireless terminal, whereby the wireless base station can intervene in the establishment of the direct communication between wireless terminals, and at the same time the above judgment is more clarified by using the information on the directions of the directional beams to enhance the actual connectable probability between two wireless terminals involved in the direct communication and the communication quality at the connection time.

Fourteenth Embodiment

This embodiment is basically based on the eighth embodiment, and an additional point of this embodiment to the eighth embodiment will be mainly described.

The additional point of this embodiment to the eighth embodiment resides in that the judgment on the angle difference of the directional beams in the eleventh to thirteenth embodiments is combined as the judgment.

This will be described with reference to FIG. 23 of the eleventh embodiment.

In the communication style in which the wireless base station communicates with the wireless terminal 101, 102 by using the directional beam as in the case of the eleventh embodiment, the reception electric field intensities of the past reception frames from the two wireless terminals involved in the requested direct communication is compared with the threshold value of the reception electric field intensity and held as reception frame information as in the case of the eighth embodiment. When the reception electric field intensities of the past reception frames from the two wireless terminals involved in the requested direct communication are equal to or larger than the threshold value of the reception electric field intensity, the wireless base station allows the direct communication request even if the angle difference of the directional beams directed to the respective wireless terminals 101 and 102 is equal to or larger than the threshold value of the angle difference for allowing the direct communication as in the case of the eleventh embodiment embodying the eleventh embodiment, for example. Furthermore, even when the reception electric field intensities are smaller than the threshold value of the reception electric field intensity, the wireless base station allows the direct communication request if the angle difference of the directional beams is smaller than the threshold value of the angle difference for allowing the direct communication request. If these conditions are not satisfied, the wireless base station rejects the direct communication request.

In the above embodiment, the combination with the twelfth embodiment has been described. However, the combination with the thirteenth embodiment embodying the eleventh embodiment may be applied. In this case, even when the angle difference of the directional beams is equal to or larger than the angle difference for rejecting the direct communication request, the wireless base station allows the direct communication request if the reception electric field intensities of the past reception frames are equal to or larger than the threshold value of the reception electric field intensity.

As described above, by combining the judgment as to the reception electric field intensity with the judgment as to the angle difference of the directional beams, the estimation precision of the wireless communication link state between two wireless terminals involved in the direct communication can be enhanced, and the actual connectable probability and the communication quality at the connection time can be enhanced.

Fifteenth Embodiment

This embodiment is basically based on the fourteenth embodiment, and an additional point of this embodiment to the fourteenth embodiment will be mainly described.

The additional point of this embodiment to the fourteenth embodiment resides in that a period for holding the reception information is provided as in the case of the ninth embodiment.

With this arrangement, the guarantee period for the reception frame information in the fourteenth embodiment is provided, so that the information reliability is more enhanced, and the estimation precision of the wireless communication link state between two wireless terminals involved in the direct communication can be more enhanced.

Sixteenth Embodiment

This embodiment is basically based on the fourteenth embodiment, and the different point of this embodiment from the fourteenth embodiment will be mainly described.

The different point of this embodiment from the fourteenth embodiment resides in that the comparison with the threshold value of the error rate is used in place of the comparison with the threshold value of the reception electric field intensity.

This will be described with reference to FIG. 23 of the eleventh embodiment.

In the communication style in which the wireless base station communicates with the wireless terminal 101, 102 by using the directional beam as in the case of the eleventh embodiment, the error rates of the past reception frames from the two wireless terminals involved in the requested direct communication are compared with the threshold value of the error rate and held as reception frame information as in the case of the tenth embodiment. When the error rates of the past reception frames from the two wireless terminals involved in the requested direct communication are smaller than the threshold value of the error rate, the wireless base station allows the direct communication request even if the angle difference of the directional beams directed to the respective wireless terminals 101 and 102 is equal to or larger than the threshold value of the angle difference for allowing the direct communication request as in the case of the twelfth embodiment embodying the eleventh embodiment. Furthermore, even if the error rates are equal to or larger than the threshold value of the error rate, the wireless base station allows the direct communication request when the angle difference of the directional beam is smaller than the threshold value of the angle difference for allowing the direct communication request. If these conditions are not satisfied, the wireless base station rejects the direct communication request.

In the above embodiment, the combination with the twelfth embodiment has been described. However, the combination with the thirteenth embodiment embodying the eleventh embodiment may be applied. In this case, even when the angle difference of the directional beams is equal to or larger than the angle difference for rejecting the direct communication request, the wireless base station allows the direct communication request if the error rates of the past reception frames are smaller than the threshold value of the error rate.

Alternatively, the comparison in reception electric field intensity and the comparison in error rate may be combined with each other, and the combination concerned may reflect the judgment based on the angle difference of the directional beams.

By combining the judgment based on the error rate with the judgment based on the angle difference of the directional beams as described above, the estimation precision of the wireless communication link state between two wireless terminals involved in the direct communication can be enhanced, and the actual connectable probability and the communication quality at the connection quality can be enhanced.

Seventeenth Embodiment

This embodiment is basically based on the eleventh to sixteenth embodiments, and an additional point of this embodiment to these embodiments will be mainly described.

The additional point of this embodiment to the eleventh to sixteenth embodiments resides in that the direction of the directional beam directed to the wireless terminal is estimated by weighting the antenna element when the directional beam is transmitted to the wireless terminal.

With this arrangement, when it is judged in the eleventh to sixteenth embodiments whether the direct communication request is allowed or not, the judgment based on the direction of the directional beam can be more clearly embodied.

Eighteenth Embodiment

This embodiment is basically based on the eleventh to sixteenth embodiments, and an additional point of this embodiment to these embodiments will be mainly described.

The additional point of this embodiment to the eleventh to sixteenth embodiments resides in that the direction of the directional beam directed to the wireless terminal is determined through estimation of an arrival angle based on a reception signal received from the wireless terminal.

With this arrangement, when it is judged in the eleventh to sixteenth embodiments whether the direct communication request is allowed or not, the judgment based on the direction of the directional beam can be more clearly embodied.

What is claimed is:

1. A wireless base station comprising:
  a transmitting and receiving portion configured to receive data frames that are transmitted from a first wireless terminal and destined for another terminal and that are transmitted from a second wireless terminal that is different from the first wireless terminal and destined for another terminal;
  a storage portion configured to extract identifiers of transmitters from the frames and stores reception information of the data frames and the identifiers; and
  a processor configured to judge whether or not to stop direct communication between the wireless terminals on the basis of the reception information of the data frames,
  wherein, in the case of making a judgment of stopping the direct communication, a stop frame for stopping the direct communication with the second wireless terminal is transmitted to the first wireless terminal from the transmitting and receiving portion,
  the storage portion stores identifiers of authenticated wireless terminals, and
  in a case where a data frame observed by the transmitting and receiving portion is a direct communication data frame and a transmitter of the direct communication data frame does not accord with any of the identifiers of the authenticated wireless terminals stored in the storage portion, the processor makes a judgment of stopping the direct communication.

2. The wireless base station according to claim 1, wherein the storage portion stores identifiers of authenticated wireless terminals, and
the first wireless terminal is one of the authenticated wireless terminals.

3. A wireless terminal that is connected to a wireless base station and is configured to make direct communication with other wireless terminals connected to the wireless base station, comprising:
   a transmitting and receiving portion configured to receive a frame that is transmitted from another wireless terminal to one of the other wireless terminals among terminals including the wireless base station; and
   a processor configured to extract an identifier of a transmitter from the frame, and judge whether or not direct communication with the wireless terminal having the extracted identifier is possible on the basis of reception information of the frame, decide whether to establish direct communication with the another wireless terminal, establish direct communication with the another wireless terminal through the wireless base station, generate or rewrite new address fields of direct communication data, and transmit said data.

4. The wireless terminal according to claim 3, further comprising a storage portion that stores identifiers of wireless terminals as candidates for direct communication,
   wherein, in the case where an identifier of a transmitter extracted from the frame is one of the stored identifiers, it is judged that direct communication with the wireless terminal having the extracted identifier is possible.

5. The wireless terminal according to claim 3, wherein the transmitting and receiving portion transmits a first data frame whose direct transmission destination is the wireless base station and whose final destination is another wireless terminal,
   the wireless terminal observes a frame transmitted by the another wireless terminal as a response to a second data frame that is transferred by the wireless base station to the another wireless terminal on the basis of the first data frame, and
   the processor judges whether direct communication with the another wireless terminal is possible or not is made using the response frame.

6. The wireless terminal according to claim 5, wherein the transmitting and receiving portion also observes the second data frame, and when the second data frame and the response frame are received, judgment of whether direct communication with the another wireless terminal is possible or not is made using the response frame.

7. The wireless terminal according to claim 5, wherein, if the response frame is addressed to the wireless base station, it is judged that direct communication with the another wireless terminal is possible.

8. The wireless terminal according to claim 3, wherein the wireless terminal uses reception electric field intensity as the reception information.

\* \* \* \* \*